(12) United States Patent
Li et al.

(10) Patent No.: US 9,072,020 B2
(45) Date of Patent: Jun. 30, 2015

(54) METHODS AND APPARATUS TO SUPPORT COORDINATED INTERFERENCE MITIGATION IN MULTI-TIER NETWORKS

(75) Inventors: Ying Li, Garland, TX (US); Zhouyue Pi, Richardson, TX (US); Baowei Ji, Plano, TX (US); Jung Je Son, Yongin-shi (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 979 days.

(21) Appl. No.: 12/851,444

(22) Filed: Aug. 5, 2010

(65) Prior Publication Data
US 2011/0051684 A1 Mar. 3, 2011

Related U.S. Application Data

(60) Provisional application No. 61/237,237, filed on Aug. 26, 2009.

(51) Int. Cl.
*H04Q 9/00* (2006.01)
*H04W 36/20* (2009.01)
*H04W 84/04* (2009.01)

(52) U.S. Cl.
CPC ............ *H04W 36/20* (2013.01); *H04W 84/045* (2013.01)

(58) Field of Classification Search
CPC .................................................. H04W 52/244
USPC ........................................................ 370/331
See application file for complete search history.

(56) References Cited

U.S. PATENT DOCUMENTS

| | | | |
|---|---|---|---|
| 8,000,655 B2 * | 8/2011 | Wang et al. .................. | 455/63.1 |
| 2011/0039569 A1 * | 2/2011 | Narasimha et al. ........ | 455/452.2 |
| 2012/0039195 A1 * | 2/2012 | Jung et al. ..................... | 370/252 |
| 2014/0080499 A1 * | 3/2014 | Brisebois et al. .......... | 455/452.1 |

FOREIGN PATENT DOCUMENTS

KR 1020090031179 A 3/2009

OTHER PUBLICATIONS

Han-Shin Jo, et al., "A Self-Organized Uplink Power Control for Cross-Tier Interference Management in Femtocell Networks", 2008 IEEE Conference on Military Communications, vol. 1, Nov. 16-19, 2008, 6 pages.
Vikram Chandrasekhar, et al., "Femtocell Networks: A Survey", IEEE Communications Magazine, vol. 46, Issue 9, Sep. 2008, p. 59-67.
Shu-ping Yeh, et al., WiMAX Femtocells: A Perspective on Network Architecture, Capacity, and Coverage, IEEE Communication Magazine, vol. 46, Issue 10, Oct. 2008, p. 58-65.
International Search Report dated Apr. 27, 2011 in connection with International Patent Application No. PCT/KR2010/005642.
Written Opinion of the International Searching Authority dated Apr. 27, 2011 in connection with International Patent Application No. PCT/KR2010/005642.

* cited by examiner

*Primary Examiner* — Wanda Z Russell

(57) ABSTRACT

For use in a wireless network, a femtocell base station in communication with at least one first mobile station is provided. The femtocell base station is configured adjust a resource of the femtocell base station to mitigate interference at a second mobile station. In certain embodiments, the femtocell base station is configured to coordinate a handover of the at least one first mobile station from the femtocell base station to a neighboring base station. In certain embodiments, the femtocell base station is configured to transmit a message regarding the resource adjustment to the at least one first mobile station.

40 Claims, 14 Drawing Sheets

METHODS AND APPARATUS TO SUPPORT COORDINATED INTERFERENCE MITIGATION IN MULTI-TIER NETWORKS

CROSS-REFERENCE TO RELATED APPLICATION(S) AND CLAIM OF PRIORITY

The present application is related to U.S. Provisional Patent Application No. 61/237,237, filed Aug. 26, 2009, entitled "METHODS AND APPARATUS TO SUPPORT COORDINATED INTERFERENCE MITIGATION IN COMMUNICATION SYSTEMS WITH FEMTOCELLS". Provisional Patent Application No. 61/237,237 is assigned to the assignee of the present application and is hereby incorporated by reference into the present application as if fully set forth herein. The present application hereby claims priority under 35 U.S.C. §119(e) to U.S. Provisional Patent Application No. 61/237,237.

TECHNICAL FIELD OF THE INVENTION

The present application relates generally to wireless communication networks and, more specifically, to methods for supporting coordinated mitigation of interference in wireless communication networks that include one or more femtocells.

BACKGROUND OF THE INVENTION

As described in the IEEE 802.16m System Requirements, a femtocell is a low power base station (BS), typically installed by a subscriber in his/her home or small office/home office (SOHO) to provide access to closed or open group of users as configured by the subscriber and/or the access provider. Femtocell BSs typically operate in licensed spectrum and may use the same or different frequency as macro cells. Femtocells often use a broadband connection such as cable or DSL for backhaul. A mobile station (MS) that communicates in a femtocell is typically stationary or moving at low (i.e. pedestrian) speed.

Femtocells are different from macro cells in a number of ways. For example, the IEEE 802.16m System Requirements document lists the following specific requirements for femtocells that distinguish them from macro cells:

"The air interface shall support features needed to limit MS's scanning, access and handover to femtocell BS's with restricted access if they are designated as part of closed subscriber group (CSG)."

"The air interface shall support preferred access and handover of MS's to their designated femto-BS's."

"The air interface should support optimized and seamless session continuity and handover between 16m Femtocell BS's and WiFi access systems."

"The air interface shall allow dense deployment of large number of femtocells by an operator."

The dense deployment of femtocells permitted by the IEEE 802.16m requirements may introduce substantial interference between a femtocell and a macro cell, and between multiple femtocells, especially in Closed Subscriber Groups (CSG), where a CSG femtocell only allows access to its own subscribers.

SUMMARY OF THE INVENTION

For use in a wireless network, a femtocell base station in communication with at least one first mobile station is provided. The femtocell base station is configured to adjust a resource of the femtocell base station to mitigate interference at a second mobile station. In certain embodiments, the femtocell base station is configured to coordinate a handover of the at least one first mobile station from the femtocell base station to a neighboring base station. In certain embodiments, the femtocell base station is configured to transmit a message to the at least one first mobile station, the message associated with at least one of the resource adjustment, a resource adjustment reason, and a resource adjustment timing.

For use in a wireless network, a mobile station capable of communicating with a femtocell base station is provided. The mobile station is configured to receive a message from the femtocell base station, the message associated with a resource adjustment of the femtocell base station, the resource adjustment to mitigate interference at a second mobile station. The mobile station is also configured, in response to the message, to coordinate a handover of the mobile station from the femtocell base station to a neighboring base station.

For use in a wireless network, a method of coordinating interference mitigation is provided. The method includes adjusting a resource of a femtocell base station in communication with at least one first mobile station to mitigate interference at a second mobile station. In certain embodiments, the method includes coordinating a handover of the at least one first mobile station from the femtocell base station to a neighboring base station. In certain embodiments, the method includes transmitting a message to the at least one first mobile station, the message associated with at least one of the resource adjustment, a resource adjustment reason, and a resource adjustment timing.

For use in a wireless network, a method of communicating with a femtocell base station is provided. The method includes receiving at a mobile station a message from the femtocell base station, the message associated with at least one of: a resource adjustment, a resource adjustment reason, and a resource adjustment timing. The method also includes, in response to the message, coordinating a handover of the mobile station from the femtocell base station to a neighboring base station.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

Figure 1:
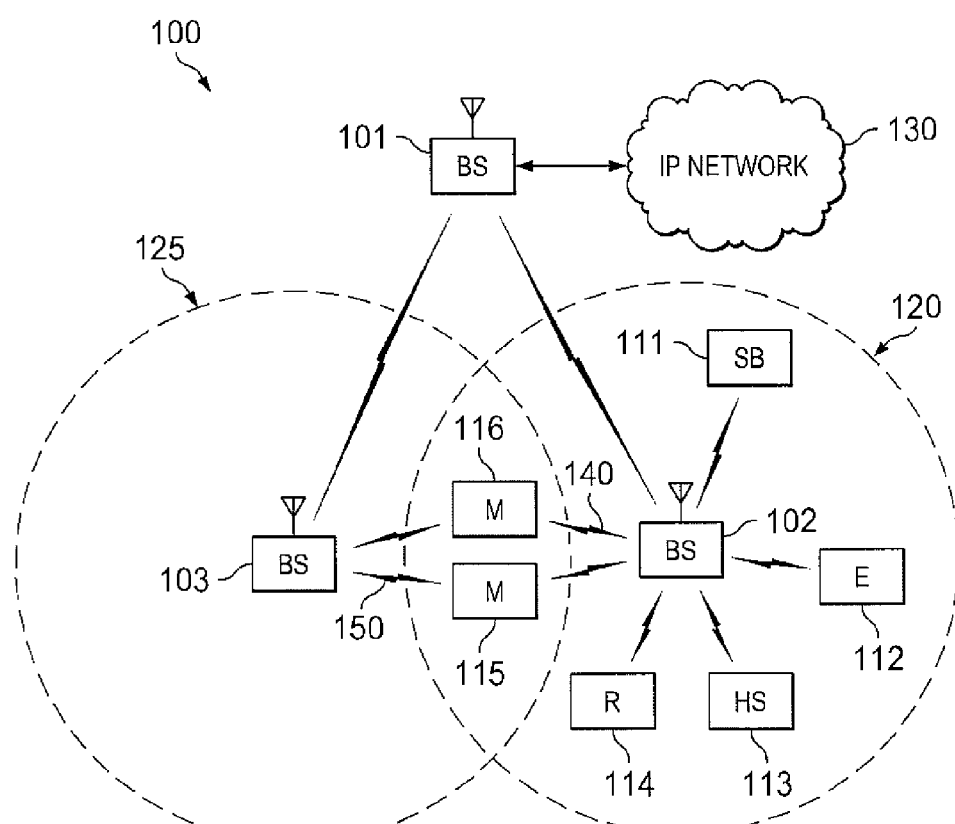
FIG. 1 illustrates an exemplary wireless network according to one embodiment of the present disclosure.

FIGS. 1 through 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication network.

The present disclosure is to support the coexistence of small, low-power base stations and larger base stations, such as macro base stations, which may overlay the low-power base stations. Throughout the disclosure, a femtocell is used as an example of a small, low-power base station, and a macrocell is used as an example of the larger base station that may overlay the smaller base station. All the embodiments are applicable to any type or size of the base stations in multi-tier networks, where some larger cell may overlay some smaller cells.

Small, low-power cells, such as femtocells, are different from larger cells, such as macro cells. The multi-tier network, with base stations of various types and sizes, may have the capability to identify femto base stations as well as to distinguish femtocells from macro cells. Further, the multi-tier network may have the capability to distinguish an open-access femtocell (which allows any compatible mobile station to access) from a Closed Subscriber Group (CSG) femtocell (which allows only authorized MS's, i.e., the MS's belonging to this femtocell, to access), since some operations, such as, but not limited to, handover, paging, and the like, will be different for femtocells and macro cells, and for open-access and CSG femtocells. For example, a MS moving at high speed may not need to handover to any femtocells, the open-access femto base stations may accept the handover requests from the MS while the MS that does not belong to a CSG femtocell may not need to send handover request to that femtocell, and so forth.

The embodiments of the present disclosure are not limited to femtocells, although femtocells are illustrated as examples of small, low-power cells. Other small, low-power cells can include picocells, hot zone cells, small relay cells, and the like. In addition, the embodiments are not limited to the macrocells, although macrocells are illustrated as examples of the larger cells that can cover or overlay the smaller cells within the coverage are of the large cell. The embodiments may be used with any type or sized base station with some level of accessibility differentiation such as open to all mobile stations (e.g., open BS), or open to limited/authorized/subscribed mobile stations (e.g., CSG BS), or open to all mobile station but with limited/authorized/subscribed mobile stations having higher priority and other mobile stations having lower priority (e.g., hybrid BS), and so forth. The concept of the CSG is not limited to femtocells only, but also can be applicable to other BSs, such as microcells, picocells, relays, and the like. The embodiments disclosed in this application are applicable to any type of the cells with different accessibility control, i.e., open BS, CSG BS, or hybrid BS, although we use CSG femtocell as an example in the application.

The following documents and standards descriptions are hereby incorporated into the present disclosure as if fully set forth herein:

IEEE 802.16m-07/002r8, IEEE 802.16m System Requirements Document, January 2009;

IEEE 802.16m-08/003r9a, IEEE 802.16m System Description Document, June 2009; and IEEE 802.16, P802.16m.D1, July 2009.

The dense deployment of femtocells permitted by the IEEE 802.16m requirements may introduce substantial interference between a femtocell and a macro cell, and between multiple femtocells, especially in a closed subscriber group (CSG), where a CSG femtocell only allows access to its own subscribers or members. When a non-member MS passes by a CSG femtocell, it cannot handover to the CSG femtocell since it is not authorized to do so. In addition, the non-member MS will receive very strong interference from the femtocell. The IEEE 802.16m System Description document and P802.16m.D1 suggest that the interference between a femtocell and a macro cell can be mitigated by static or semi-static radio resource reservation and resource sharing using FDM, TDM, and/or downlink power control.

The proposals suggested in the IEEE 802.16m System Description document and P802.16m.D1 emphasize that a CSG femtocell should reserve part of its resources (e.g., time/frequency/power) to mitigate the interference to non-member MSs connected to a macro cell. However, if the coordination is not well-planned, a MS in communication with the femtocell may suffer a reduction in the quality of service (QoS), a sudden change of resources, or even a dropped connection. In certain cases, the QoS for MSs in communication with macro or femtocells is guaranteed. In such cases, a reduction in QoS would violate the guarantee. However, the IEEE 802.16m System Description document and P802.16m.D1 do not provide solutions for ensuring QoS in a macro cell and femtocell. What is needed is a smooth resource adaptation that allows a CSG femtocell to reserve resources to mitigate the interference to non-member MSs connected to a macro BS.

The present disclosure provides a method and apparatus to support coordinated interference mitigation in communication systems with femtocells. The present disclosure solves the problems of how to guarantee the QoS of MSs in communication with a macro cell and/or a femtocell. The present disclosure also provides a smooth resource adaptation that allows a CSG femtocell to reserve its resources to mitigate the interference to non-member MSs connected to a macro BS.

The solutions described herein are based on the coordination of the CSG femtocell and the serving BS of the non-member MS. In certain embodiments, the coordination is controlled by the BS. The BS controls the timing for the actual resource adaptation of the femtocell to mitigate interference for a non-member MS. The BS also controls the timing for the member MS to prepare for the resource adaptation, so that the member MS does not suffer a sudden degradation of the QoS or a dropped connection. The exemplary use case is to mitigate the interference from a CSG femtocell to a non-member MS connected to a macro BS or other BS, while guaranteeing QoS for a member MS.

FIG. 1 illustrates an exemplary wireless network 100 according to one embodiment of the present disclosure. In the illustrated embodiment, wireless network 100 includes base station (BS) 101, base station (BS) 102, and base station (BS) 103. Base station 101 communicates with base station 102 and base station 103. Base station 101 also communicates with Internet protocol (IP) network 130, such as the Internet, a proprietary IP network, or other data network.

Base station 102 provides wireless broadband access to network 130, via base station 101, to a plurality of subscriber stations within coverage area 120 of base station 102. The first plurality of subscriber stations includes subscriber station (SS) 111, subscriber station (SS) 112, subscriber station (SS) 113, subscriber station (SS) 114, subscriber station (SS) 115 and subscriber station (SS) 116. Subscriber stations 111-116 may be any wireless communication device, such as, but not limited to, a mobile phone, mobile PDA and any mobile station (MS). In an exemplary embodiment, SS 111 may be located in a small business (SB), SS 112 may be located in an enterprise (E), SS 113 may be located in a WiFi hotspot (HS), SS 114 may be located in a residence (R), and SS 115 and SS 116 may be mobile devices.

Base station 103 provides wireless broadband access to network 130, via base station 101, to a plurality of subscriber stations within coverage area 125 of base station 103. The plurality of subscriber stations within coverage area 125 includes subscriber station 115 and subscriber station 116. In alternate embodiments, base stations 102 and 103 may be connected directly to the Internet by means of a wired broadband connection, such as an optical fiber, DSL, cable or T1/E1 line, rather than indirectly through base station 101.

In other embodiments, base station 101 may be in communication with either fewer or more base stations. Furthermore, while only six subscriber stations are shown in FIG. 1, it is understood that wireless network 100 may provide wireless broadband access to more than six subscriber stations. It is noted that subscriber station 115 and subscriber station 116 are on the edge of both coverage area 120 and coverage area 125. Subscriber station 115 and subscriber station 116 each communicate with both base station 102 and base station 103 and may be said to be cell-edge devices interfering with each other. For example, the communications between BS 102 and SS 116 may be interfering with the communications between BS 103 and SS 115. Additionally, the communications between BS 103 and SS 115 may be interfering with the communications between BS 102 and SS 116.

Subscriber stations 111-116 may use the broadband access to network 130 to access voice, data, video, video teleconferencing, and/or other broadband services. In an exemplary embodiment, one or more of subscriber stations 111-116 may be associated with an access point (AP) of a WiFi WLAN. Subscriber station 116 may be any of a number of mobile devices, including a wireless-enabled laptop computer, personal data assistant, notebook, handheld device, or other wireless-enabled device. Subscriber station 114 may be, for example, a wireless-enabled personal computer, a laptop computer, a gateway, or another device.

Dotted lines show the approximate extents of coverage areas 120 and 125, which are shown as approximately circular for the purposes of illustration and explanation only. It should be clearly understood that the coverage areas associated with base stations, for example, coverage areas 120 and 125, may have other shapes, including irregular shapes, depending upon the configuration of the base stations and variations in the radio environment associated with natural and man-made obstructions.

Also, the coverage areas associated with base stations are not constant over time and may be dynamic (expanding or contracting or changing shape) based on changing transmission power levels of the base station and/or the subscriber stations, weather conditions, and other factors. In an embodiment, the radius of the coverage areas of the base stations, for example, coverage areas 120 and 125 of base stations 102 and 103, may extend in the range from less than 2 kilometers to about fifty kilometers from the base stations.

As is well known in the art, a base station, such as base station 101, 102, or 103, may employ directional antennas to support a plurality of sectors within the coverage area. In FIG. 1, base stations 102 and 103 are depicted approximately in the center of coverage areas 120 and 125, respectively. In other embodiments, the use of directional antennas may locate the base station near the edge of the coverage area, for example, at the point of a cone-shaped or pear-shaped coverage area.

Figure 1A:
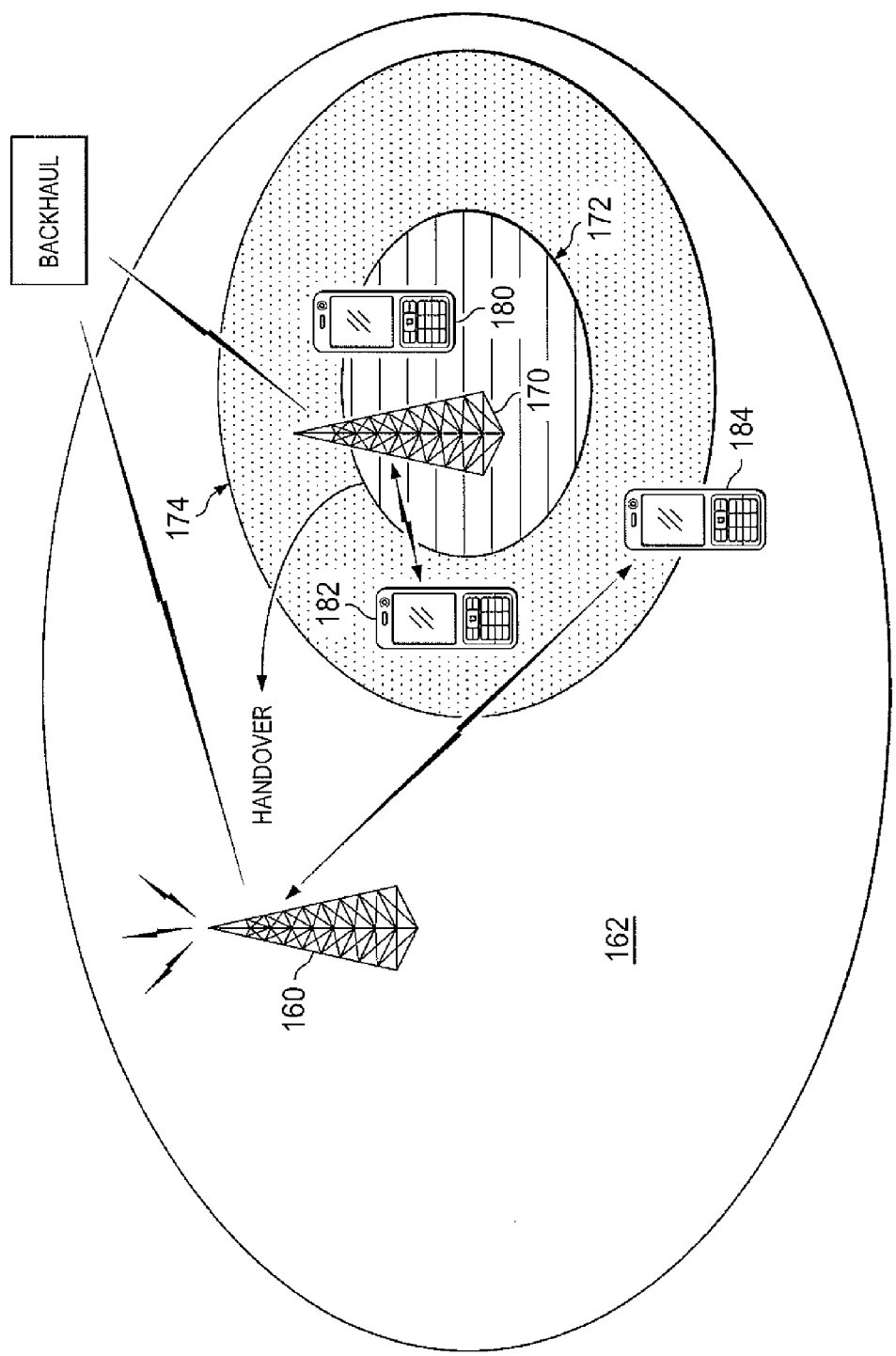
FIG. 1A illustrates an example of CSG femtocell interference mitigation for non-member MSs, according to one embodiment of the present disclosure.

FIG. 1A illustrates an example of CSG femtocell interference mitigation for non-member MSs, according to one embodiment of the present disclosure. In the illustrated embodiment, a macro BS 160 provides wireless network access within coverage area 162. In certain embodiments, macro BS 160 may represent one of BSs 101-103 in FIG. 1. FIG. 1A also includes a closed subscriber group (CSG) femtocell BS 170, which provides wireless access within femtocell coverage area 174. Femto CSG member MSs 180 and 182 communicate with CSG femtocell BS 170. Femto CSG non-member MS 184 communicates with macro BS 160. In certain embodiments, each of MSs 180-184 may represent one of subscriber stations 111-116 in FIG. 1.

In certain embodiments, CSG femtocell BS 170 and macro BS 160 transmit and receive in the same frequency band. This is beneficial for member MSs 180 and 182, which may alternately communicate with both femtocell BS 170 and macro BS 160. However, since non-member MS 184 is within coverage area 174 of CSG femtocell BS 170, but is not part of the CSG, non-member MS 184 experiences interference in its communication with macro BS 160.

To mitigate this interference, femtocell BS 170 reduces its coverage by reducing its downlink transmission power, or by not transmitting in certain predetermined time and/or frequency slots. For example, femtocell BS 170 may reduce its downlink transmission power, thus reducing its coverage area from coverage area 174 to coverage area 172. The reduced coverage serves to reduce the interference to non-member MS 184. However, the reduced coverage may also affect the connections to one or more of the CSG member MSs. For example, member MS 182 may no longer be able to communicate with femtocell BS 170 when its coverage is reduced to coverage area 172. Thus, member MS 182 may need to handover to macro BS 160.

Before an actual resource adjustment occurs, the CSG femtocell BS 170 may predict the consequences of the adjustment. For example, femtocell BS 170 may determine which of MSs 180-182 need to be handed over because of the resource adjustment. Alternatively, CSG femtocell BS 170 may inform MSs 180-182 of the resource adjustment, and allow MSs 180-182 to predict the consequences of the adjustment, such as whether each MS needs to be handed over. If a handover is needed for the any of member MSs 180-182, then femtocell BS 170 may assist its member MSs 180-182 in performing the handover. This may include getting everything prepared for the handover before the actual change of the resource, such as power/time/frequency reduction, then performing the actual resource change. This is explained in greater detail below.

Figure 2:
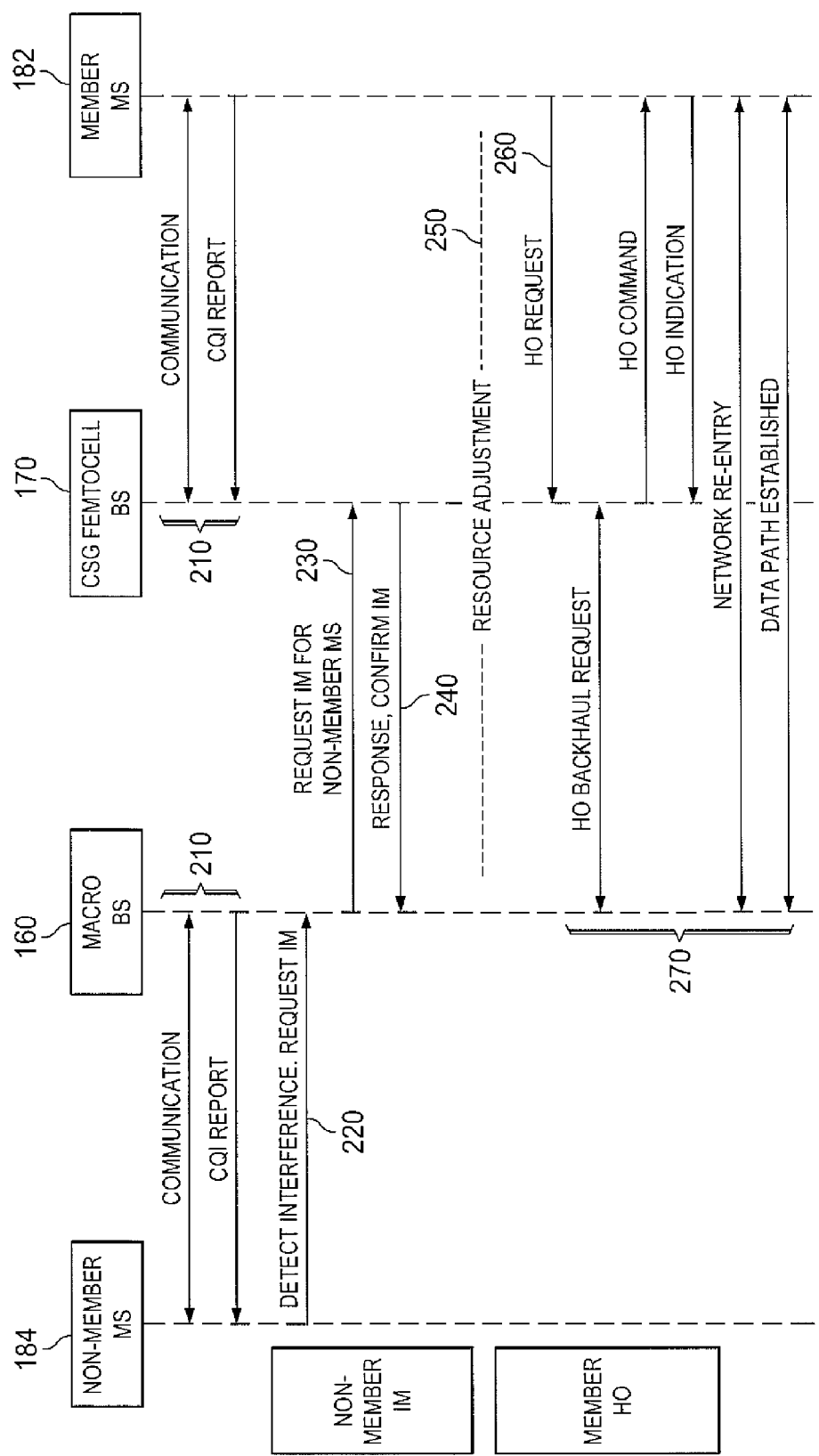
FIG. 2 illustrates a timeline that depicts interference mitigation for a non-member MS and a member MS handover, according to one embodiment of the present disclosure.

FIG. 2 illustrates a timeline that depicts interference mitigation for a non-member MS and a member MS handover, according to one embodiment of the present disclosure. The timeline is described with respect to the network shown in FIG. 1A. The timeline starts with communication between non-member MS 184 and macro BS 160, and communication between CSG femtocell BS 170 and member MS 182 (indicated at 210). MS 182 and 184 may measure and report the channel conditions, such as the channel quality information (CQI). The measurement may be signal interference and noise ratio (SINR), signal noise ratio (SNR), etc. Non-member MS 184 detects interference from femtocell BS 170 while in coverage area 174 and transmits a request for interference mitigation to macro BS 160 (indicated at 220). Macro BS 160 passes the request for interference mitigation to femtocell BS 170 (indicated at 230). Femtocell BS 170 provides a response back to macro BS 160 confirming that the interference mitigation will occur (indicated at 240). Next, a resource adjustment occurs (indicated at 250). The resource adjustment may include femtocell BS 170 reducing its coverage from coverage area 174 to coverage area 172.

Due to the resource adjustment, member MS 182 may find that its connection with femtocell BS 170 is compromised. This may include a degradation of QoS or even a dropped connection. Thus, member MS 182 may determine that a handover to macro BS 160 is needed. Member 182 requests a handover to macro BS 160 (indicated at 260). The handover request is processed through the backhaul between femtocell BS 170 and macro BS 160, and a data path is established between member MS 182 and macro BS 160 (indicated at 270). At this point, the ability of member MS 182 to communicate is restored. Although macro BS 160 is used here as an example, it will be understood that the embodiment is not limited to this case. The MS 182 may hand over to other neighboring base stations, which may not necessarily be macro BS 160. The same relaxation may apply to the other embodiments.

The drawback to this procedure is that member MS 182 is not aware of non-member MS 184's request for interference mitigation until after femtocell BS 170 makes the resource adjustment. This may cause member MS 182 to have a sudden degradation of service, or even a dropped connection. However, this problem can be resolved if femtocell BS 170 or member MS 182 predicts the consequences of the adjustment and makes advance preparations, such as preparing for a possible handover. Then, after the initial preparations, the actual adjustment can be performed.

Figure 3:
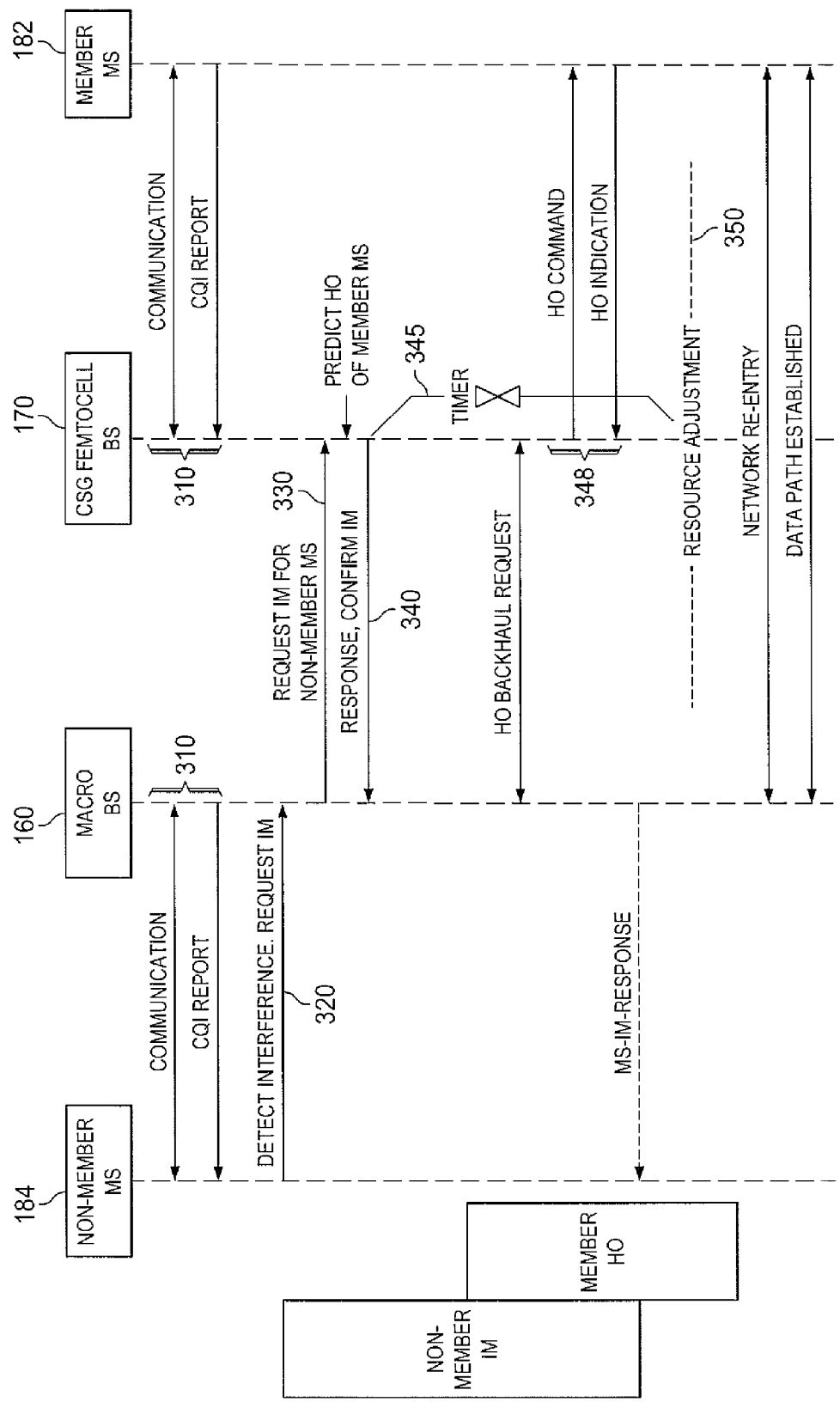
FIG. 3 illustrates a second timeline that depicts interference mitigation for a non-member MS and a member MS handover, according to one embodiment of the present disclosure.

FIG. 3 illustrates a second timeline that depicts interference mitigation for a non-member MS and a member MS handover, according to one embodiment of the present disclosure. In this embodiment, the interference mitigation is timely coupled with a consequential handover, and the resource adjustment is triggered by a timer.

As in FIG. 2, the time line starts with communication between non-member MS 184 and macro BS 160, and communication between CSG femtocell BS 170 and member MS 182 (indicated at 310). Non-member MS 184 detects interference from femtocell BS 170 while in coverage area 174 and requests interference mitigation (indicated at 320). Macro BS 160 passes the request for interference mitigation to femtocell BS 170 (indicated at 330). Femtocell BS 170 provides a response back to macro BS 160 confirming that the interference mitigation will occur (indicated at 340).

Alternatively, a network entity such as femtocell BS 170, a gateway, or self-organizing networks (SON) server, etc., may detect that the non-member MS 184 is interfered by the femtocell BS 170, or the network entity may detect that the non-member MS 184 is nearby femtocell BS 170. Alternatively, it is detected that non-member MS 184 is interfered by femtocell BS 170, or MS 184 reports the femtocell BS 170 and its measurement related to the signal strength from femtocell BS 170 to the other network entity or entities. In any one of these cases, the network entity or entities can coordinate via the backhaul or higher layers with femtocell BS 170, by sending an indication or message to femtocell BS 170 to inform femtocell BS 170 that the IM for the particular MS may be needed and request the IM. The message may include the identity of non-member MS 184. Then femtocell BS 170 may send an IM confirmation to confirm whether the IM is going to be performed. Or alternatively, femtocell BS 170 may contact the network entity or entities about its status (e.g., current downlink transmission power, current configuration, etc.), so that the network entity or entities can get the information and make a decision on whether femtocell BS 170 should perform an interference mitigation, and in which manner, etc. The decision making could be interacted by messages of the information needed.

As an enhancement to the embodiment depicted in FIG. 2, an interference mitigation (IM) timer is set at femtocell BS 170 (indicated at 345). The IM timer controls the timing of the actual resource adjustment for the interference mitigation for non-member MS 184 (indicated at 350). The timer information may be sent from CSG femtocell BS 170 to its member MS 182, so that member MS 182 may know the timing of the actual resource adjustment. If the handover of member MS 182 is prepared and the handover (HO) command from femtocell BS 170 to member MS 182 is sent before expiration of the timer, the timer information can be sent via the handover command. Member MS 182 receives the timer information, and it coordinates its handover to macro BS 160 around the timing indicated by the timer (indicated at 348). Thus, the handover of member MS 182 to macro BS 160 is substantially completed at the time of the actual resource adjustment. In certain embodiments, member MS 182, macro BS 160, and femtocell BS 170 may perform a handover initiation and handover preparation phase before the resource adjustment.

As an extension of the embodiment above, femtocell BS 170 predicts the handover of member MS 182 and assists member MS 182 in the preparation of the handover. Member MS 182 may measure and report the measurement related to the channel conditions with the serving femtocell, report the identity of the neighboring cells, measure and report the measurement related to signal strength from the corresponding neighboring cells. For example, MS 182 can measure and report the measurement related to signal strength from its serving cell femtocell BS 170 and neighboring cell, e.g., macro BS 160, and report the corresponding cell identity of macro BS 160. The reported measurement from the MS can help femtocell BS 170 make a prediction on whether the MS needs to hand out.

For example, if for the MS there is no good candidate BS with a relatively good channel condition for handover, the femtocell may decide not to hand out the MS and it may refuse to do the resource adjustment. If there is good candidate BS that the MS can handover to, then the femtocell may decide to hand out the MS. If the IM timer expires before completion of the handover preparation, the IM timer will not be reflected in the handover command message. If the IM timer will expire after the handover command in the handover preparation, the action time of the handover in the handover command will be set to substantially coincide with the timing of the actual resource adjustment indicated by the IM timer.

Among the benefits of the embodiment described in FIG. 3 is that the IM timer provides flexibility in provisioning QoS to non-member MS 184 and member MS 182. For example, if non-member MS 184's request for interference mitigation is urgent, the time can be set to a shorter interval. Otherwise, the timer can be coordinated with the handover preparation time for member MS 182, such that the handover preparation could be finished before the timer expires. In such a case, both non-member MS 184 and member MS 182 may enjoy better QoS.

Figure 4:
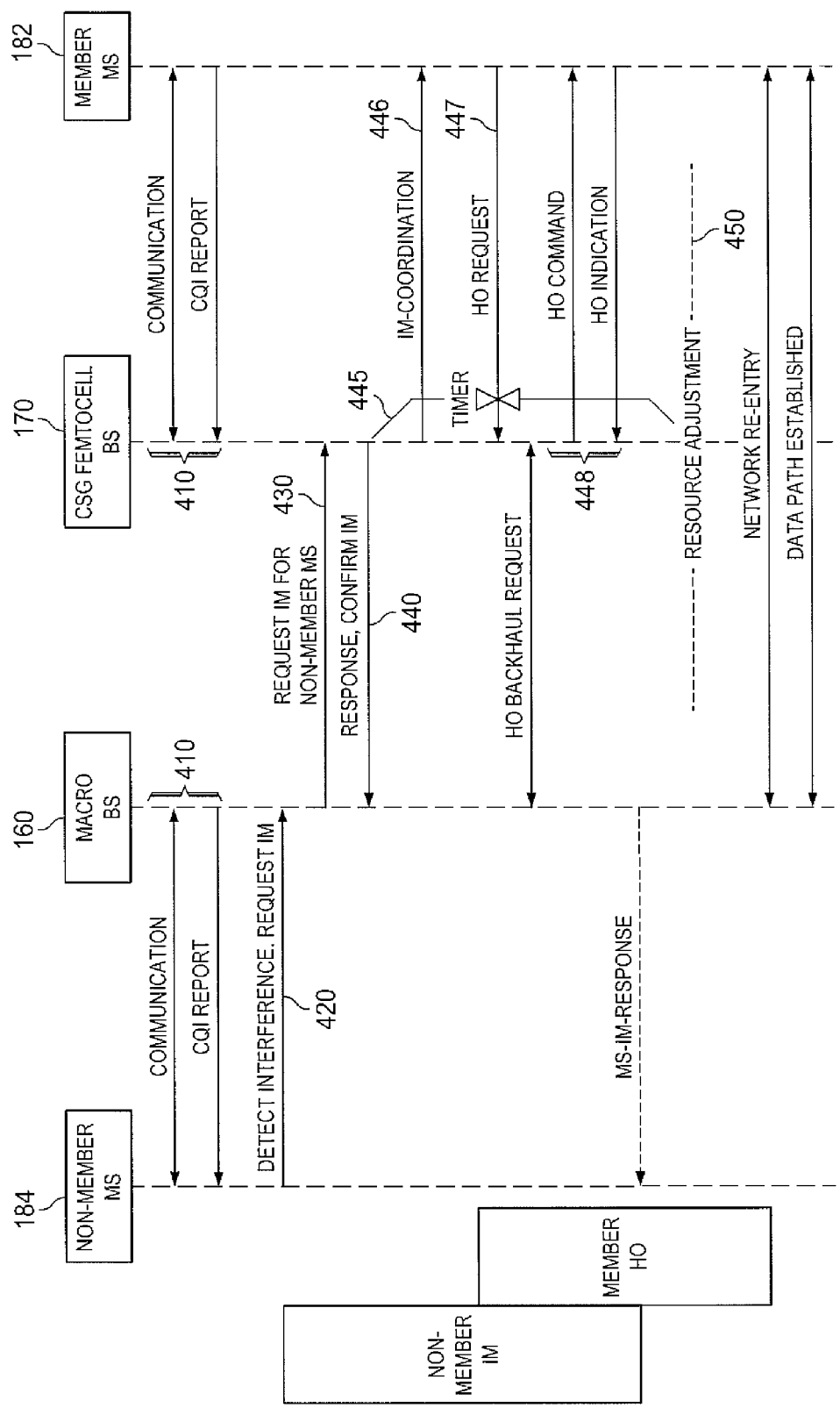
FIG. 4 illustrates a third timeline that depicts interference mitigation for a non-member MS and a member MS handover, according to one embodiment of the present disclosure

FIG. 4 illustrates a third timeline that depicts interference mitigation for a non-member MS and a member MS handover, according to one embodiment of the present disclosure. In this embodiment, the interference mitigation is timely coupled with the consequential handover, the resource adjustment is triggered by a timer, and the MS controls the handover.

As in FIG. 3, the time line starts with communication between non-member MS 184 and macro BS 160, and communication between CSG femtocell BS 170 and member MS 182 (indicated at 410). Non-member MS 184 detects interference from femtocell BS 170 while in coverage area 174 and requests interference mitigation (indicated at 420). Macro BS 160 passes the request for interference mitigation to femtocell BS 170 (indicated at 430). Femtocell BS 170 provides a response back to macro BS 160 confirming that the interference mitigation will occur (indicated at 440). An interference mitigation (IM) timer is set at femtocell BS 170 (indicated at 445). The IM timer controls the timing of the actual resource adjustment for the interference mitigation for non-member MS 184 (indicated at 450).

As an enhancement to the embodiment depicted in FIG. 3, femtocell BS 170 sends an IM-Coordination message to member MS 182 (indicated at 446). The IM-Coordination message may be unicast, multicast, or broadcast. The IM-Coordination message may be part of other messages combining other information. The IM-coordination message may contain the manner of IM, the timing for IM, and any other suitable information related to the IM. Based on the information in the IM-coordination message, member MS 182 decides whether it needs to perform a handover to macro BS 160. If member MS 182 determines that a handover is needed, then member MS 182 sends the HO request (indicated at 447). Member MS 182 then coordinates its handover to macro BS 160 around the timing indicated by the timer (indicated at 448), or the timing for the resource adjustment indicated in IM-Coordination message.

In the case that a femto BS resource adjustment due to interference mitigation affects one or more MS that are originally connected with femtocell BS 170, the femtocell BS 170 may send resource-adjustment information to the subordinated MSs to prevent the MSs from going out of service. The resource-adjustment information may be transmitted using an IM-Coordination message or another message including the fields of IM-Coordination message.

Before executing a resource adjustment, femtocell BS 170 may request some subordinated MSs to perform a handover to a neighbor cell if required. The MAC message of the IM-Coordination or other message including the fields of IM-Coordination message may be unicast/multicast to the MSs. Femtocell BS 170 may finish handover initiation and handover preparation phases before it does the resource adjustment. In certain embodiments, member MS 182, macro BS 160, and femtocell BS 170 may perform a handover initiation and handover preparation phase before the resource adjustment.

If there is another network entity that is coordinating the interference management, then macro BS 160 and femtocell BS 170 may communicate with the network entity and provide the information of the resource adjustment related to the interference management. Then the network entity can send (e.g., by unicast, multicast, or broadcast) the IM-Coordination message or message including one or multiple fields of the IM-Coordination message to the MS. Such network entity, for example, can be a gateway, or a server for self-organizing networks (SON), etc. The message may indicate the reason for sending the message, the reason for resource adjustment or resource reconfiguration, what the resource adjustment or resource reconfiguration is, and the timing for the resource adjustment.

Among the benefits of the embodiment described in FIG. 4 is that rather than CSG femtocell BS 170 predicting the handover of member MS 182, the member MS 182 can decide whether it needs the handover. This gives member MS 182 the flexibility to quickly make its own decision. The approach notifies member MS 182 about the IM adjustment prior to the actual adjustment, so that member MS 182 can prepare in advance. In such a case, both non-member MS 184 and member MS 182 can enjoy better QoS.

In certain embodiments, the IM-coordination message from femtocell BS 170 to member MS 182 may contain information about the decision to adjust its resources, the reason for the decision, and the expected timing for the adjustment. Upon receiving the IM-coordination message, member MS 182 may adjust itself accordingly. For example, femtocell BS 170 may adjust its transmission schedule such that one or more time or frequency partitions are scheduled not to transmit anything (perhaps not even transmit a control channel, such as a broadcast channel). In such a case, member MS 182 will adjust its listening schedule to not listen to femtocell BS 170 on the time or frequency partition(s) when there is nothing transmitted.

In certain embodiments, the IM-coordination message may contain a field indicating the reason for the information. For example, one bit can be used to indicate:
  '1' for interference management or reliability;
  '0' for others.

In certain embodiments, the IM-coordination message may contain a field indicating the manner of interference mitigation. For example, the field may be a two-bit field having the following possible values:
  00 indicating downlink power control/setting or downlink transmission power reduction;
  01 indicating frequency reservation;
  10 indicating time reservation;
  11 reserved.

In another embodiment, the field may be only one bit and may have the following possible values:
  0 indicating frequency reservation;
  1 indicating time reservation.

In certain embodiments, the IM-coordination message may contain a field indicating the specific resource reserved. This field may be jointly coded with the field indicating the manner of interference mitigation. For example, for downlink power control, a field indicating adjusted power (in dB) may have the following values:
  000: power down 5 dB;
  001: power down 10 dB;
  010: power down 15 dB, etc.

For another example, for a resource reservation in time domain, a field indicating the reserved resource not to use by the femto can be used and it may have the following bitmap with each bit '1' indicating the corresponding subframe is reserved:
  '10000' reserve the first subframe not to use;
  '01000' reserve the second subframe not to use;
  '00100' reserve the third subframe not to use;
  '00110' reserve the third and fourth subframes not to use; etc.

For another example, for a resource reservation in time domain, a field indicating the reserved resource that will be used by the femto can be applied and it may have the following bitmap with each bit '1' indicating the corresponding subframe is reserved for femto use:
  '10000' reserve the first subframe for femto use;
  '01000' reserve the second subframe for femto use;
  '00100' reserve the third subframe for femto use;
  '00110' reserve the third and fourth subframes for femto use; etc.

The units can be frames, etc., instead of subframes. If there are several given patterns for the reservation, then an indication can be based on the patterns (e.g., pattern 0 with indication '000', pattern 1 with indication '001', etc.). When a subframe or frame, etc. is reserved not to use, the preambles or the synchronization channel, and the broadcast channel (e.g., the primary broadcast channel or second broadcast channel) may or may not be sent. Similar indications can be done for the reservation in frequency domain, in the units of subcarriers, etc. Similar indications can be done for the reservation jointly in time/frequency domain, or in space domain for the antenna angles or beam directions, etc.

In certain embodiments, the IM-coordination message may contain a field indicating the value of the timer. The timer value can represent frame numbers, super frame numbers, a value of a system clock, or any other suitable value.

In certain embodiments, the IM-coordination message may contain a field indicating the effective time for the resource adjustment. For example, a field can be used to indicate when the downlink transmitting power will be reduced. Or for each type of resource adjustment, there may be a timing field to indicate the effective timing for the resource adjustment or the timing for the new configuration to be effective. In certain embodiments, there could be also a timing field for each type of resource adjustment to indicate the time when the old configuration expires. This timing field could be omitted if there is no timing gap between when the old configuration expires and when the new configuration becomes effective. The timing value can be in the units of frame number, super frame number, system clock, etc.

Figure 5:
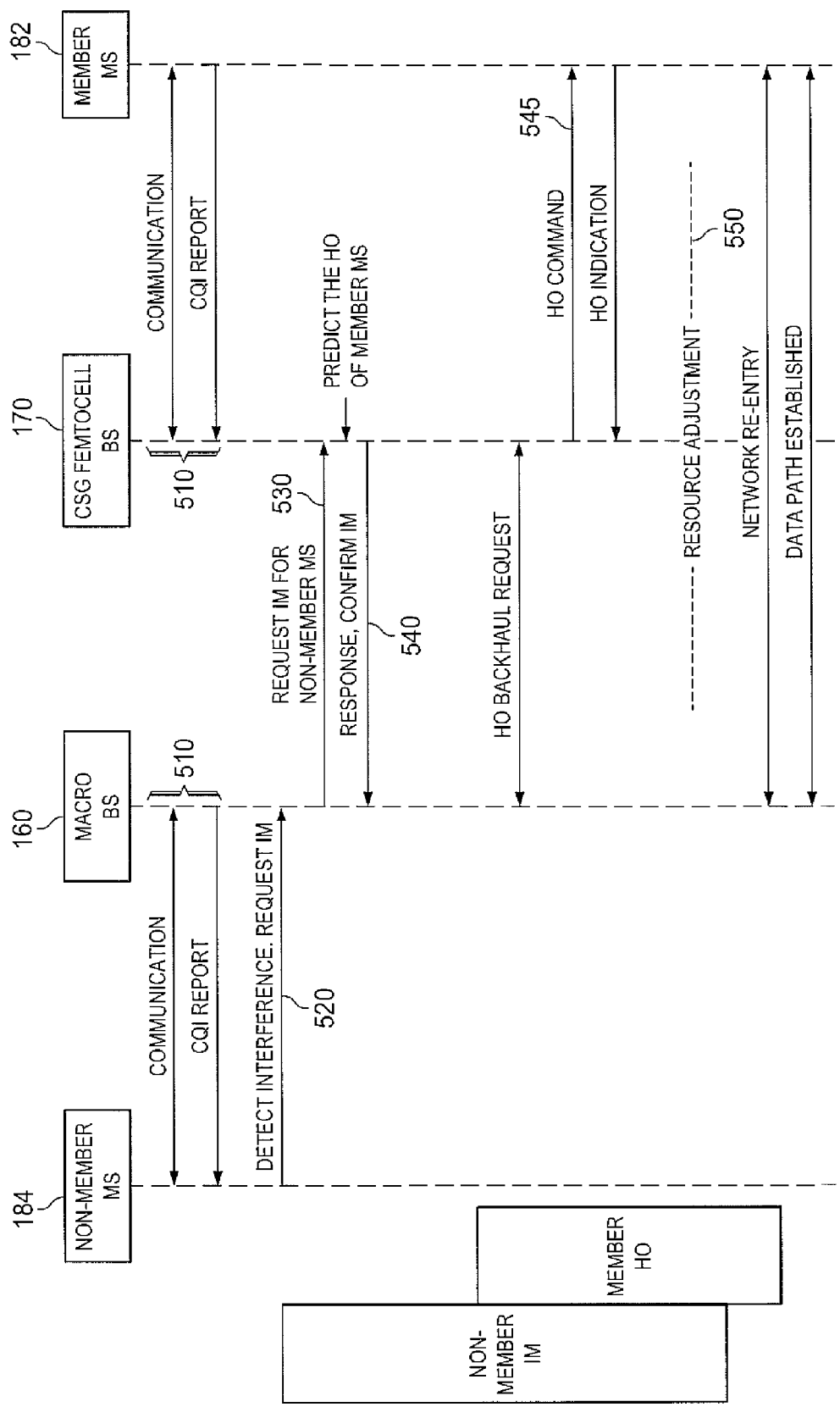
FIG. 5 illustrates a fourth timeline that depicts interference mitigation for a non-member MS and a member MS handover, according to one embodiment of the present disclosure.

FIG. 5 illustrates a fourth timeline that depicts interference mitigation for a non-member MS and a member MS handover, according to one embodiment of the present disclosure. In this timeline, the interference mitigation is timely coupled with a consequential handover, and the resource adjustment is triggered by a HO Command message.

As described in other embodiments, the time line starts with communication between non-member MS 184 and macro BS 160, and communication between CSG femtocell BS 170 and member MS 182 (indicated at 510). Non-member MS 184 detects interference from femtocell BS 170 while in coverage area 174 and requests interference mitigation (indicated at 520). Macro BS 160 passes the request for interference mitigation to femtocell BS 170 (indicated at 530). Femtocell BS 170 provides a response back to macro BS 160 confirming that the interference mitigation will occur (indicated at 540).

As an enhancement to the embodiments described above, the actual resource adjustment for the interference mitigation for non-member MS 182 may be triggered by the messages related to the handover of member MS 182, such as the handover command message. For example, femtocell BS 170 sends the handover command to member MS 182 (indicated at 545). The handover command triggers the actual resource adjustment for the interference mitigation (indicated at 550). If there is an "action time" field in the handover command directing member MS 182 when to execute the handover, the action time can be the actual resource adjustment time, or even later. In certain embodiments, member MS 182, macro BS 160, and femtocell BS 170 may perform a handover initiation and handover preparation phase before the resource adjustment.

Among the benefits of the embodiment described in FIG. 5 is that the handover preparation of member MS 182 finishes before the actual resource adjustment because femtocell BS 170 holds the resource adjustment for IM for non-member MS 184 until the preparation of HO of member MS 182 is done. Thus, member MS 182 enjoys good QoS provision. Non-member MS 184 may have to wait for the IM. However, if non-member MS 184's request for IM is not urgent, then a wait may not be a problem.

Figure 6:
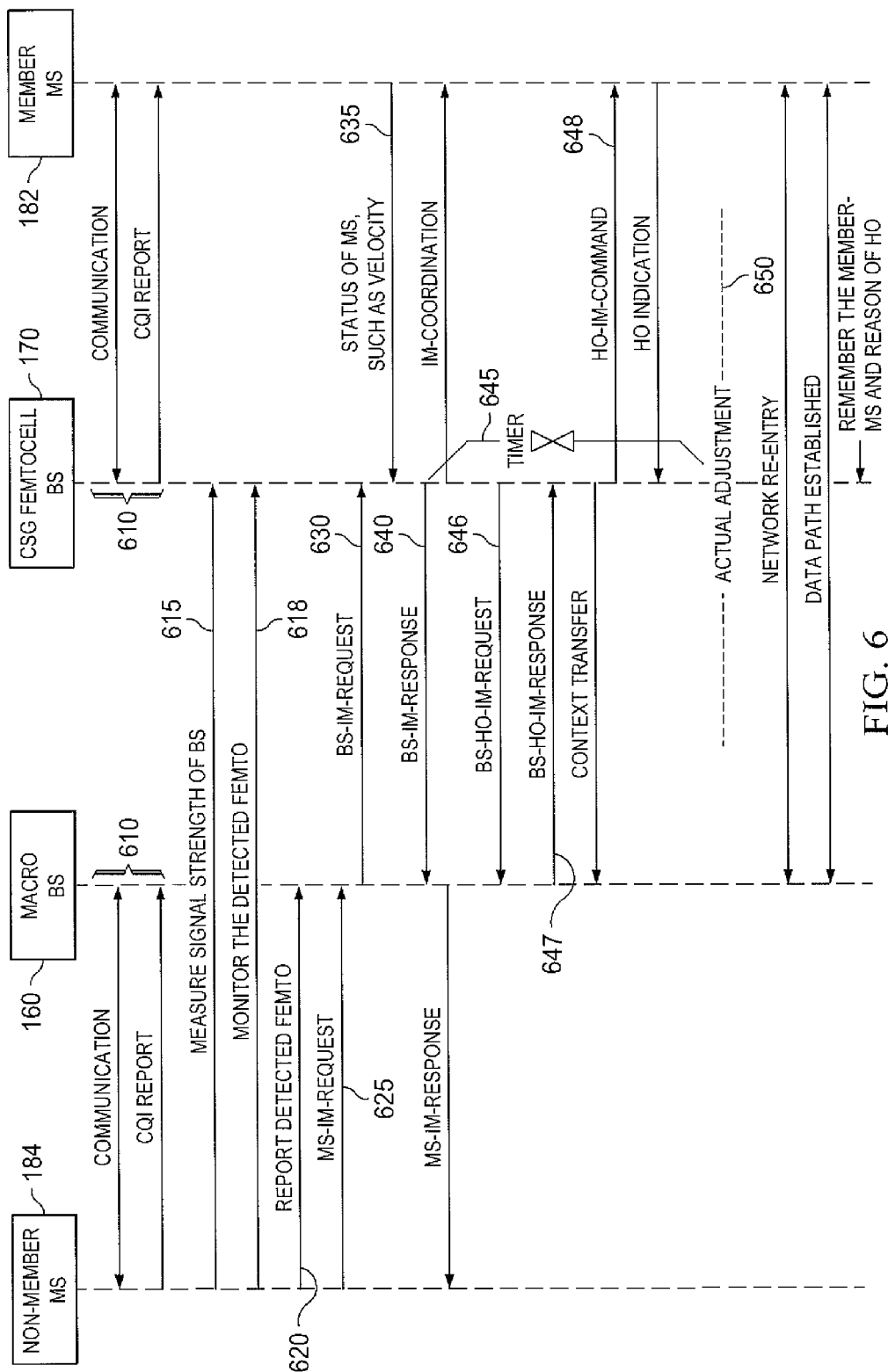
FIG. 6 illustrates a fifth timeline that depicts interference mitigation for a non-member MS and a member MS handover, according to one embodiment of the present disclosure.

FIG. 6 illustrates a fifth timeline that depicts interference mitigation for a non-member MS and a member MS handover, according to one embodiment of the present disclosure. In this embodiment, the resource adjustment of the CSG femtocell BS is coordinated with handover of the member MSs to the macro BS. One of the benefits of this embodiment is that the member MSs enjoy timely adaptation for the CSG femtocell BS resource adjustment, while non-member MS enjoy timely interference mitigation.

As described in other embodiments, the time line starts with communication between non-member MS 184 and macro BS 160, and communication between CSG femtocell BS 170 and member MS 182 (indicated at 610).

Next, non-member MS 184 scans for nearby BSs. Non-member MS 184 may detect CSG femtocell BS 170; however, since MS 184 is a non-member, femtocell BS 170 is not accessible. Non-member MS 184 measures the signal strength of femtocell BS 170 (indicated at 615). Next, non-member MS 184 monitors femtocell BS 170 (indicated at 618). In some embodiments, non-member MS 184 monitors femtocell BS 170 only when the velocity of non-member MS 184 is below a threshold. Next, non-member MS 184 detects interference from femtocell BS 170. Non-member MS 184 reports the detection of femtocell BS 170 to macro BS 160 (indicated at 620). In some embodiments, non-member MS 184 reports the detected femtocell BS 170 only when the velocity of non-member MS 184 is below a threshold, or the signal of femtocell BS 170 is larger than a threshold, or the SIR is below a threshold.

Next, non-member MS 184 may trigger interference mitigation by sending a MS-IM-Request message to macro BS 160 (indicated at 625). This may occur if non-member MS 184 decides by itself that interference mitigation is needed, e.g., due to reduced QoS. The interference mitigation may also be triggered by macro BS 160. The MS-IM-Request message may be a message with a MAC management message type or a part of another message (e.g., a part of the mobile report to macro BS 160).

Next, macro BS 160 sends a BS-IM-Request message to the CSG femtocell BS 170 (indicated at 630). The BS-IM-Request message may contain fields indicating MS velocity, MS measured SIR or resource needed (e.g., the difference between required SIR and the current SIR), MS QoS types, access class, or any other suitable information.

Next, CSG femtocell BS 170 gets a report of nearby member MSs and non-member MSs (indicated at 635). The report contains any one or more of the following: service classes, traffic types, measured signal strength, signal-to-noise ratio (SNR), signal-to-interference/noise ratio (SINR), signal-to-interference ratio (SIR), required SIR, the difference between required SIR and the current SIR, moving speed (velocity), and any other suitable information. CSG femtocell BS 170 uses the report to decide whether to adjust a resource, how much to adjust the resource, and in which manner to adjust the resource.

Next, a timer T is defined for the interval between the time when femtocell BS 170 decides to have a resource adjustment for interference mitigation and the time when femtocell BS 170 performs the resource adjustment (indicated at 645). The value of timer T can be configurable. In certain embodiments, timer T may be a function of the status of the system, such as non-member/member MS's quality of service (QoS), traffic class, a difference between the desired QoS level (e.g., measured by SIR, etc.) and the QoS level, access level/class, moving speed (velocity), delay-sensitivity level, and any other suitable system status parameter.

Figure 7:
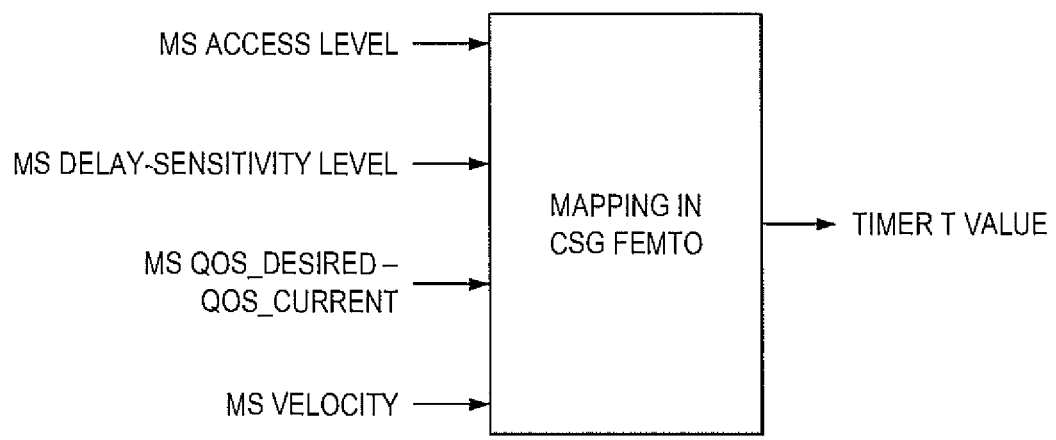
FIG. 7 depicts an example of the information that may be used to determine the value of timer T, according to one embodiment of the present disclosure.

FIG. 7 depicts an example of the information that may be used to determine the value of timer T, according to one embodiment of the present disclosure. The value of timer T may be configurable. For instance, the value can be any element from a set $\{t1, t2, \ldots, tN\}$, where $t1<t2<\ldots<tN$. If it is more urgent to help non-member MS 184 to maintain its QoS, then the value of timer T can be smaller, so that femtocell BS 170 can make a resource adjustment quickly. This may occur if non-member MS 184 has higher access priority, delay-sensitive traffic, a velocity at a certain level, a very low SIR, etc. On the other hand, if it is more urgent to maintain member MS 182's QoS (e.g., member MS 182 belongs to a higher access class, or has delay-sensitive traffic, etc.), then the value of timer T can be larger.

The following is example of how to determine a value of timer T. An urgency score is calculated as a function of a MS's quality of service (QoS) traffic class, access class, and moving speed (velocity). A higher access class, increased delay sensitivity, and/or higher velocity results in a higher urgency score. For example, the urgency score is $$\text{UrgencyScore} = w1^*\text{AccessLevel} + w2^*\text{Velocity} + w3^*\text{DelaySensitivityLevel} + w4^*\text{ResourceNeeded}$$

where w1, w2, w3, w4 are weights, AccessLevel indicates the access priority (a larger value meaning higher priority), Velocity indicates the moving speed, DelaySensitivityLevel indicates the level of delay sensitivity (a larger value meaning more delay sensitive), and ResourceNeeded indicates the resource needed based on the current status and a required QoS (e.g., the difference between a required SIR and the current SIR).

The timer T can be decided by the urgency scores of member MS 182 and non-member MS 184. A higher urgency score for non-member MS 184 results in a smaller value for timer T. A higher urgency score for member MS 182 results in a larger value for timer T. If both scores are high, femtocell BS 170 may choose a suitable value for timer T.

The value of timer T can also be decided by successively comparing factors (i.e., compare the factors one by one) of access level, delay sensitivity level, resource needed, velocity, etc., rather than a weighted sum of the score. For example, femtocell BS 170 may first compare the resource needed (e.g., the difference between a required SIR and the current SIR) for both member MS 182 and non-member MS 184. If the values are different enough to decide a timer value, then femtocell BS 170 may choose a value. If the values are very similar, then femtocell BS 170 next compares the access level for both member MS 182 and non-member MS 184, and so on.

Returning now to FIG. 6, CSG femtocell BS 170 may decide whether to perform interference mitigation for non-member MS 184, or reject the IM request. Femtocell BS 170 considers the QoS provision of both non-member MS 184 and member MS 182, then makes a decision. If the IM can help non-member MS 184 without hurting the member MS 182 much, then femtocell BS 170 will perform the IM. If femtocell BS 170 decides to ask member MS 182 to handover to macro BS 160, then femtocell BS 170 assists the handover. In one embodiment, femtocell BS 170 may ask member MS 182 to handover only if member MS 182 maintain a satisfactory QoS after the handover. For example, member MS 182 may be communicating only VoIP traffic. Based on monitoring of macro BS 160, femtocell BS 170 may predict that a handover would still provide good-quality VoIP for member MS 182. In this case, member MS 182 may handover to macro BS 160. Such a prediction may also be carried out by member MS 182, in which case member MS 182 sends a response to femtocell BS 170.

In one embodiment of the current invention, femtocell BS 170 sends a BS-IM-Response message to macro BS 160 (indicated at 640). The BS-IM-Response message may contain a field indicating the manner of interference mitigation. For example, the field may be a two-bit field having the following possible values:

00 indicating downlink power control;
01 indicating frequency reservation;
10 indicating time reservation;
11 Reserved.

In certain embodiments, the BS-IM-Response message may contain a field indicating the specific resource reserved. This field may be jointly coded with the field indicating the manner of interference mitigation. Additionally, the BS-IM-Response message may contain a field having the value of timer T.

In one embodiment of the current invention, femtocell BS 170 may send a message (e.g., a BS-HO-IM-Request message) to macro BS 160 to request to handover member MS 182 to macro BS 160 (indicated at 646). The BS-HO-IM-Request message may include the reason for the handover, the expected time of the handover, the MS IDs of each MS that will be handed over, traffic type, access level, and any other suitable information. The BS-HO-IM-Request message may be a separate message, or it may be realized by adding one or more fields in another message, such as a BS-HO-REQ message.

Upon receiving the BS-HO-IM-Request, macro BS 160 may send a message (e.g., a BS-HO-IM-Response message) to femtocell BS 170 to confirm the handover of member MS 182 to macro BS 160 (indicated at 647). The BS-HO-IM-Response message may include the expected QoS provision. The BS-HO-IM-Response message may be a separate message, or it may be realized by adding one or more fields in another message, such as a BS-HO-RSP message.

Next, femtocell BS 170 sends a message (e.g., a HO-IM-Command message) to member MS 182 to ask it to handover (indicated at 648). The message may include the reason and/or the timing of the handover. The HO-IM-Command message may be a separate message, or it may be realized by adding one or more fields in another message, such as a HO-CMD message.

The remainder of the timeline illustrated in FIG. 6 is similar to the timelines of FIGS. 2-5. For example, the resource adjustment for the interference mitigation for non-member MS 184 occurs at 650.

Various changes may be made to the components and timelines depicted in FIGS. 2-6. For example, member MS 182 could actually represent more than one member MS. Similarly, non-member MS 184 could actually represent more than one non-member MS. Also, the makeup and arrangement of the steps in FIGS. 2-6 is for illustration only. Steps could be added, omitted, combined, or placed in any other suitable configuration according to particular needs.

At some point after a handover of a member MS from a femtocell BS to a macro BS, it may be possible to hand the member MS back to the femtocell BS. This may be desirable after interference with a non-member MS is no longer an issue.

Figure 8:
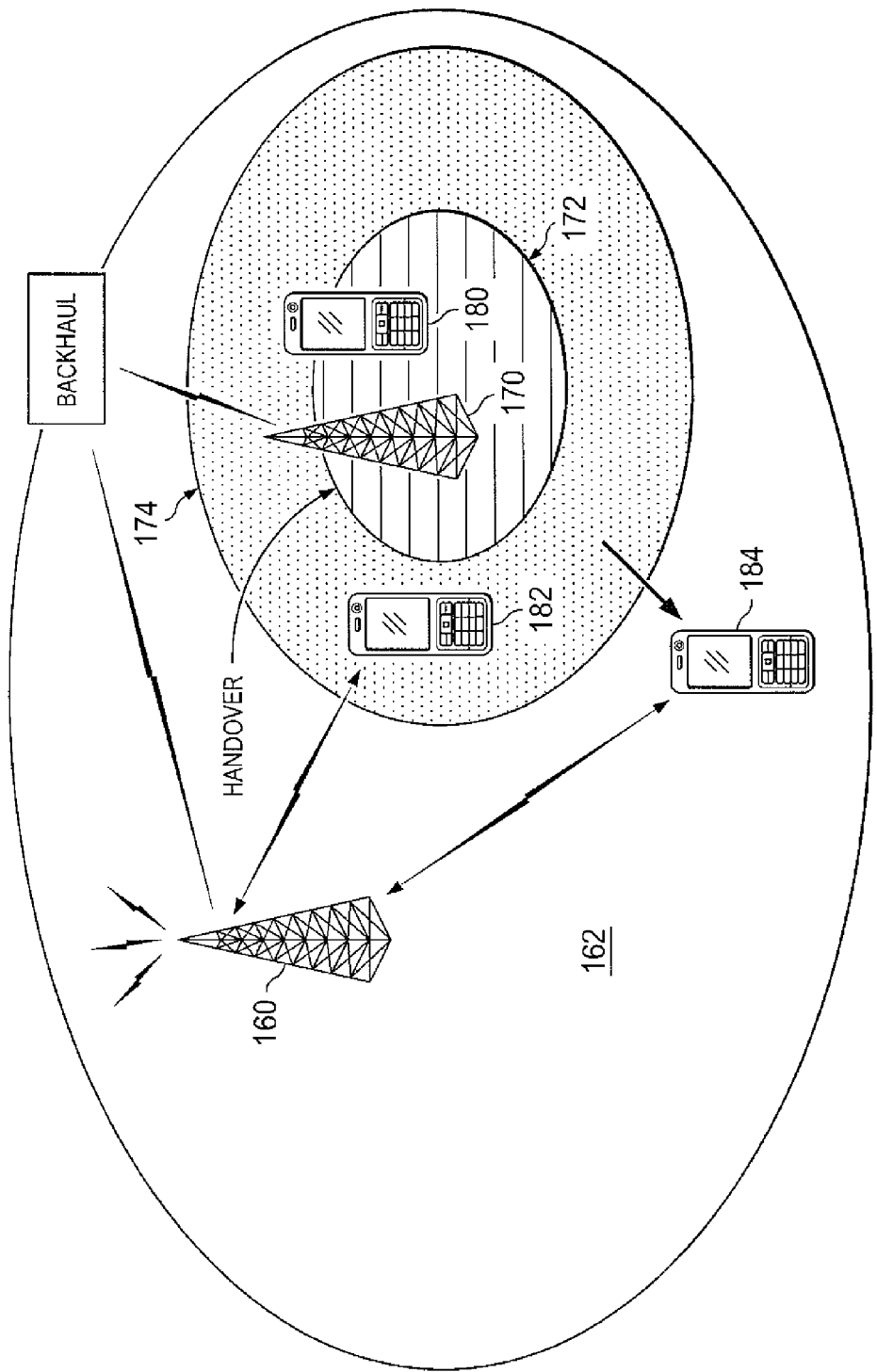
FIG. 8 illustrates an example of a handover back to a CSG femtocell BS once interference mitigation for a non-member MS is resolved, according to one embodiment of the present disclosure.

FIG. 8 illustrates an example of a handover back to a CSG femtocell BS once interference mitigation for a non-member MS is resolved, according to one embodiment of the present disclosure. In the illustrated embodiment, CSG femtocell BS 170 caches information describing which of member MSs 180, 182 was handed over to macro BS 160. Later, when non-member MS 184 moves away from femtocell BS 170, or it finishes the communication session with macro BS 160, the interference mitigation for non-member MS 184 may no longer be needed. At that point, a handover of member MS 182 back to femtocell BS 170 can be performed.

Femtocell BS 184 may notify member MSs 180, 182 that it is resuming the same resource mode as before the interference mitigation. Member MS 182, which handed over to macro BS 160, can handover back to femtocell BS 170. Depending on the information that is available about the original handover, the network re-entry back to femtocell BS 170 can be simplified. For example, femtocell BS 170 may cache member MS 182's MAC ID, station ID (which is used in contention-based access and bandwidth request, etc.), basic capabilities, security capabilities, security context (such as the authentication keys, etc.), and so on, and MS 182 may cache femtocell BS 170's base station ID, basic capabilities, security capabilities, security context, and so on, to simplify the authorization and network re-entry. The network entity such as the serving base station of the MS may indicate the MS whether a simplified network re-entry can be performed, where the indication can be sent via, e.g., a message. The network entity may get such indication via its communication with the femtocell, which is the target base station of the MS in this case. The network entity such as the serving base station can put femtocell BS 170 in a higher priority in the handover list to the MS 182. These are described in greater detail below.

Figure 9:
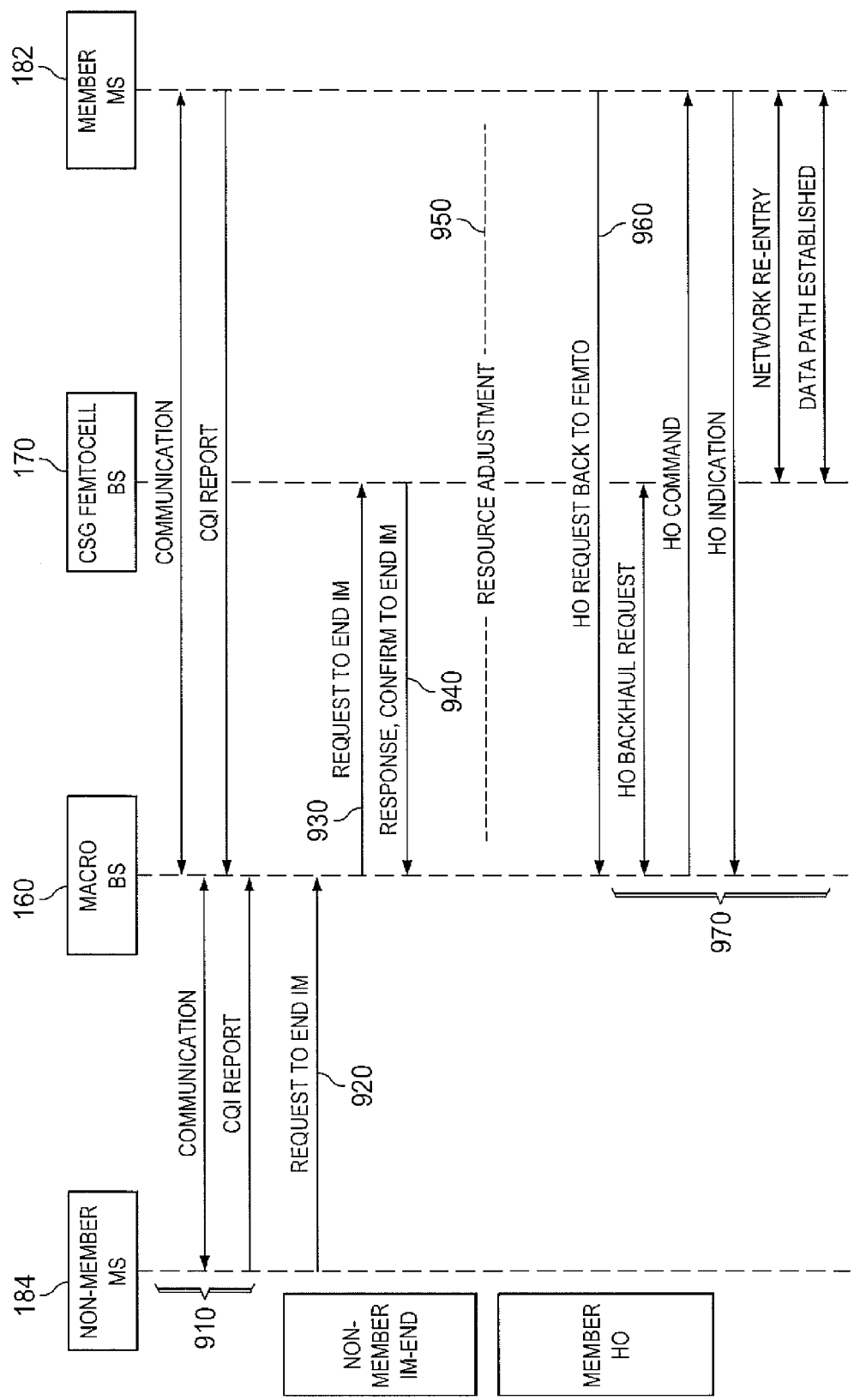
FIG. 9 illustrates a timeline that depicts an interference mitigation ending for a non-member MS and a consequential member MS handover, according to one embodiment of the present disclosure.

FIG. 9 illustrates a timeline that depicts an interference mitigation ending for a non-member MS and a consequential member MS handover, according to one embodiment of the present disclosure. The timeline is described with respect to the network shown in FIG. 8.

The timeline starts with communication between non-member MS 184 and macro BS 160, and communication between macro BS 160 and member MS 182 (indicated at 910). At this point, femtocell BS 170 does not communicate with member MS 182 because of an earlier handover. Non-member MS 184 detects that it is leaving coverage area 174, so interference from femtocell BS 170 is no longer likely. Non-member MS 184 requests to end the interference mitigation (indicated at 920). Macro BS 160 passes the request to end interference mitigation to femtocell BS 170 (indicated at 930).

Alternatively, the network entity such as a nearby femto, or femtocell BS 170, or gateway, etc., may detect that non-member MS 184 is moving away from femtocell BS 170, or non-member MS 184 may hand over to other BS. In this case, the network entity can send an indication or message to femtocell BS 170 to inform femtocell BS 170 that the IM for the particular MS may not be needed. The message may include the identity of non-member MS 184.

Femtocell BS 170 provides a response back to macro BS 160 confirming that the interference mitigation will end (indicated at 940). Next, a resource adjustment occurs (indicated at 950). The resource adjustment may include femtocell BS 170 increasing its coverage from coverage area 172 to coverage area 174.

Next, after the resource adjustment of femtocell BS 170 from coverage area 172 to coverage area 174, member MS 182 detects that there is a sudden interference from femtocell BS 170. Accordingly, member MS 182 requests a HO back to femtocell BS 170 (indicated at 960). The HO request is processed through the backhaul between femtocell BS 170 and macro BS 160, and a data path is established between member MS 182 and femtocell BS 170 (indicated at 970). At this point, member MS 182 is once again in communication with femtocell BS 170.

The drawback to this procedure is that member MS 182 is not aware of non-member MS 184's request to end interference mitigation until after femtocell BS 170 makes the resource adjustment. This may cause member MS 182 to have a sudden degradation of QoS, or even a dropped connection. The following embodiments offer a solution to this problem.

Figure 10:
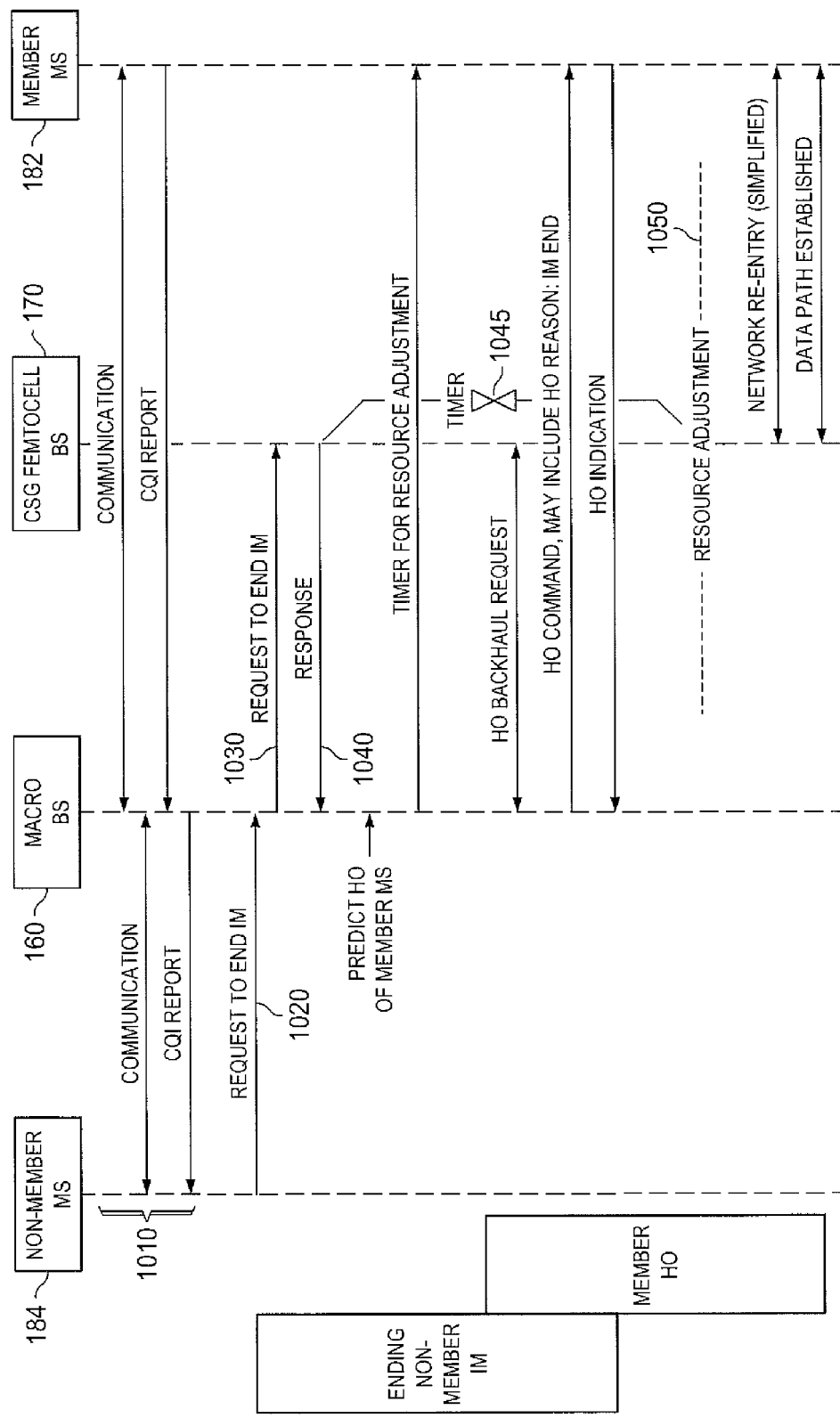
FIG. 10 illustrates a second timeline that depicts an interference mitigation ending for a non-member MS and a handover of a member MS, according to one embodiment of the present disclosure.

FIG. 10 illustrates a second timeline that depicts an interference mitigation ending for a non-member MS and a handover of a member MS, according to one embodiment of the present disclosure. In this embodiment, the end of the interference mitigation is timely coupled with a consequential handover, the resource adjustment is triggered by a timer, and the BS controls the handover.

As in FIG. 9, the timeline starts with communication between non-member MS 184 and macro BS 160, and communication between macro BS 160 and member MS 182 (indicated at 1010). Non-member MS 184 detects that it is leaving coverage area 174, so interference from femtocell BS 170 is no longer likely. Non-member MS 184 requests to end the interference mitigation (indicated at 1020). Macro BS 160 passes the request to end interference mitigation to femtocell BS 170 (indicated at 1030). Femtocell BS 170 provides a response back to macro BS 160 confirming that the interference mitigation will end (indicated at 1040).

As an enhancement of the embodiment depicted in FIG. 9, an interference mitigation ending (IM-End) timer may be set at femtocell BS 170 (indicated at 1045). The IM-End timer controls the timing of the actual resource adjustment made possible by the end of interference mitigation for non-member MS 184 (indicated at 1050). The timer information may be sent from CSG femtocell BS 170 to macro BS 160. Macro BS 160 can then predict the handover of member MS 182 back to femtocell BS 170. If the IM-End timer expires before the completion of the handover preparation, the IM-End timer will not be reflected in the handover command (HO-CMD). If the IM-End timer will expire after the HO-CMD in the handover preparation, the action time of the handover in the HO-CMD will be set to coincide with the timing of the actual resource adjustment indicated by the IM-End timer.

Among the benefits of the embodiment described in FIG. 10 is that the IM timer provides a flexible ending time for IM, and there can be time to prepare for the HO. In such a case, member MSs currently connected to femtocell BS 170 and member MSs that handover to femtocell BS 170 may enjoy better QoS.

Figure 11:
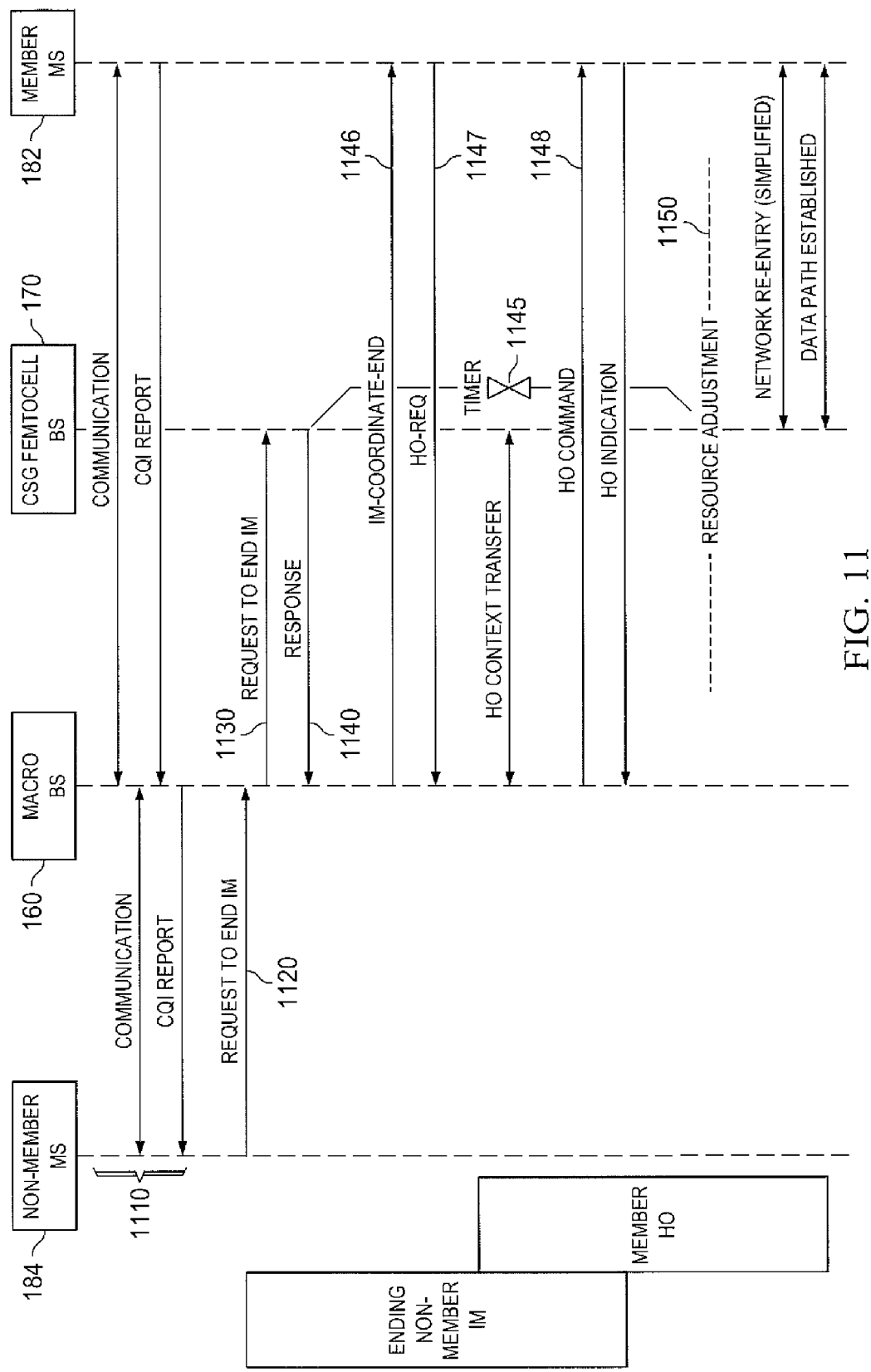
FIG. 11 illustrates a third timeline that depicts an interference mitigation ending for a non-member MS and a handover of a member MS, according to one embodiment of the present disclosure.

FIG. 11 illustrates a third timeline that depicts an interference mitigation ending for a non-member MS and a handover of a member MS, according to one embodiment of the present disclosure. In this embodiment, the end of the interference mitigation is timely coupled with a consequential handover, the resource adjustment is triggered by a timer, and the MS controls the handover.

As in FIG. 10, the timeline starts with communication between non-member MS 184 and macro BS 160, and communication between macro BS 160 and member MS 182 (indicated at 1110). Non-member MS 184 detects that it is leaving coverage area 174, so interference from femtocell BS 170 is no longer likely. Non-member MS 184 requests to end the interference mitigation (indicated at 1120). Macro BS 160 passes the request to end interference mitigation (IM-End request) to femtocell BS 170 (indicated at 1130). The identifier of MS 184 may be included in the request. Femtocell BS 170 provides a response back to macro BS 160 confirming that the interference mitigation will end (indicated at 1140). Femtocell BS 170 may remember the member MS who has handed out because of the resource adjustment for interference management, and it may remember which base station it has handed out to. If the member MS has handed out to the macrocell BS 160, then in the response of IM-End request, the identifier of MS 182 may be included. An interference mitigation ending (IM-End) timer is set at femtocell BS 170 (indicated at 1145). The IM-End timer controls the timing of the actual resource adjustment made possible by the end of interference mitigation for non-member MS 184 (indicated at 1150).

As an enhancement to the embodiment depicted in FIG. 10, after getting the confirmation from femtocell BS 170 that the interference mitigation will end, macro cell BS 160 sends an IM-Coordination-End message to femto CSG member MS 182 (indicated at 1146). The IM-Coordination-End message may contain the manner of IM-End, the timing for IM-End, and any other suitable information related to the IM-End. Based on the information in the IM-coordination-End message, member MS 182 decides whether it needs to perform a handover to femtocell BS 170. If member MS 182 determines that a handover is needed, then member MS 182 sends a HO request (HO-REQ, indicated at 1147). If the IM timer expires before the member MS HO preparation, the IM-End timer will not be reflected in the HO-CMD (indicated at 1148). If the IM timer will expire after the HO-CMD in the consequential member MS HO preparation, the HO-CMD will set the action time of the handover in the HO-CMD as the timing of the actual resource adjustment indicated by the IM-End timer.

Alternatively, femtocell BS 170 may send the response of IM-End request to multiple nearby base stations, or to the other network entity (such as gateway, SON server, etc.) that may coordinate the interference mitigation. In the response, MS 182 identification may be included. Then the network entity may contact with multiple base stations to ask them to let the identified MS 182 to come back to femtocell BS 170. If the MS 182 is in the base station coverage, the base station may inform the MS by sending an IM-Coordination-End message.

Or alternatively, the network entity such as base stations, femtocell BS 170, macro BS 160, or SON server or gateway can broadcast/multicast/unicast the message (e.g., IM-Coordination-End) which contains the information that femtocell BS 170 (with base station identifier) is terminating the interfering management and restoring the resource and the information about the timing of restoring the resource, and the information about which manner of the resource restoring, etc, to the mobile stations. If the mobile station 182 who handed out from the base station 170 hears the message, it may request a handover back to the femto 170.

Among the benefits of the embodiment described in FIG. 11 is that rather than CSG femtocell BS 170 predicting the handover of member MS 182, member MS 182 can decide whether it needs the handover. This gives member MS 182 the flexibility to quickly make its own decision. The approach notifies member MS 182 about the IM-End adjustment prior to the actual adjustment, so that member MS 182 can prepare in advance.

In certain embodiments, the IM-Coordination-END message may contain a field indicating the manner of interference mitigation. For example, the field may be a two-bit field having the following possible values:
    00 indicating downlink power control;
    01 indicating frequency reservation;
    10 indicating time reservation;
    11 reserved.

In another embodiment, the field may be only one bit and may have the following possible values:
    0 indicating frequency reservation;
    1 indicating time reservation.

In certain embodiments, the IM-Coordination-END message may contain a field indicating the specific resource reserved. This field may be jointly coded with the field indicating the manner of interference mitigation. For example, for downlink power control, a field of adjusted power (in dB) can be indicated according to the following values:
    000: power up 5 dB;
    001: power up 10 dB;
    010: power up 15 dB, etc.

In certain embodiments, the IM-coordination-END message may contain a field indicating the value of the timer. The timer value can represent frame numbers, super frame numbers, a value of a system clock, or any other suitable value. In certain embodiments, the IM-coordination-END message may contain the identity of the MS implicitly or explicitly, and may contain the base station identifier of the BS that is going to restore the resource or end the interference mitigation. In certain embodiments, the IM-Coordination-END message may be merged with the IM-Coordination message into one message. An optional indicator may be used to indicate these two types.

Figure 12:
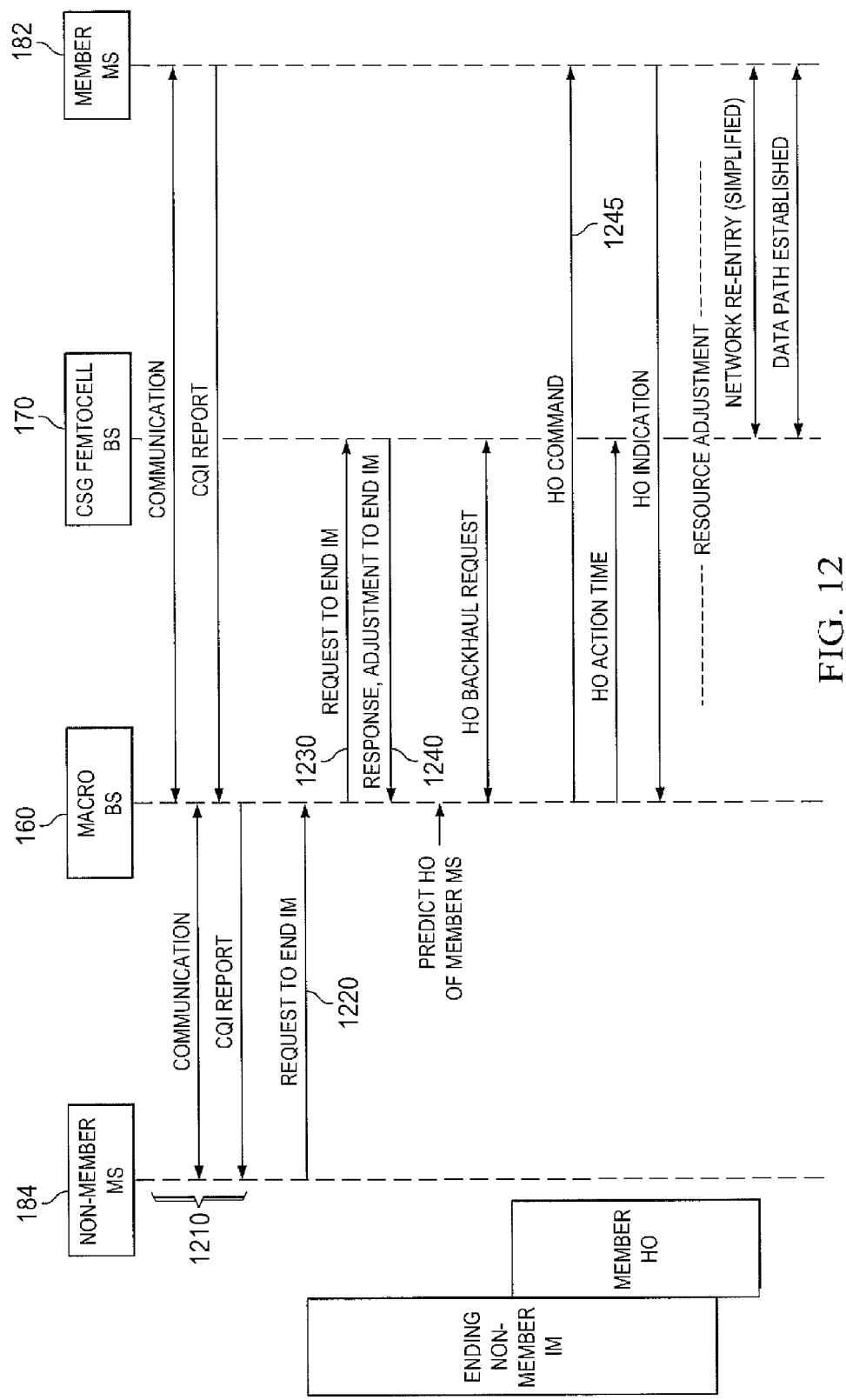
FIG. 12 illustrates a fourth timeline that depicts an interference mitigation ending for a non-member MS and a handover of a member MS, according to one embodiment of the present disclosure.

FIG. 12 illustrates a fourth timeline that depicts an interference mitigation ending for a non-member MS and a handover of a member MS, according to one embodiment of the present disclosure. In this timeline, the interference mitigation ending is timely coupled with a consequential handover, and the resource adjustment is triggered by a HO Command message.

As described in other embodiments, the timeline starts with communication between non-member MS 184 and macro BS 160, and communication between macro BS 160 and member MS 182 (indicated at 1210). Non-member MS 184 detects that it is leaving coverage area 174, so interference from femtocell BS 170 is no longer likely. Non-member MS 184 requests to end the interference mitigation (indicated at 1220). Macro BS 160 passes the request to end interference mitigation to femtocell BS 170 (indicated at 1230). Femtocell BS 170 provides a response back to macro BS 160 confirming that the interference mitigation will end (indicated at 1240).

As an enhancement to the embodiments described above, when the IM is ending, the femtocell BS 170 holds the resource adjustment for some time, until the preparation for the handover of member MS 182 is complete. Backhaul negotiations are performed to align the timing. Macro BS 160 sends a handover command message to member MS 182 (indicated at 1245). If there is an "action time" field in the handover command directing member MS 182 when to execute the handover, the action time can be the actual resource adjustment time, or even later.

Among the benefits of this described in FIG. 12 is that the handover preparation of member MS 182 finishes before the actual resource adjustment. Thus, Member MS 182 enjoys good QoS provision.

Figure 13:
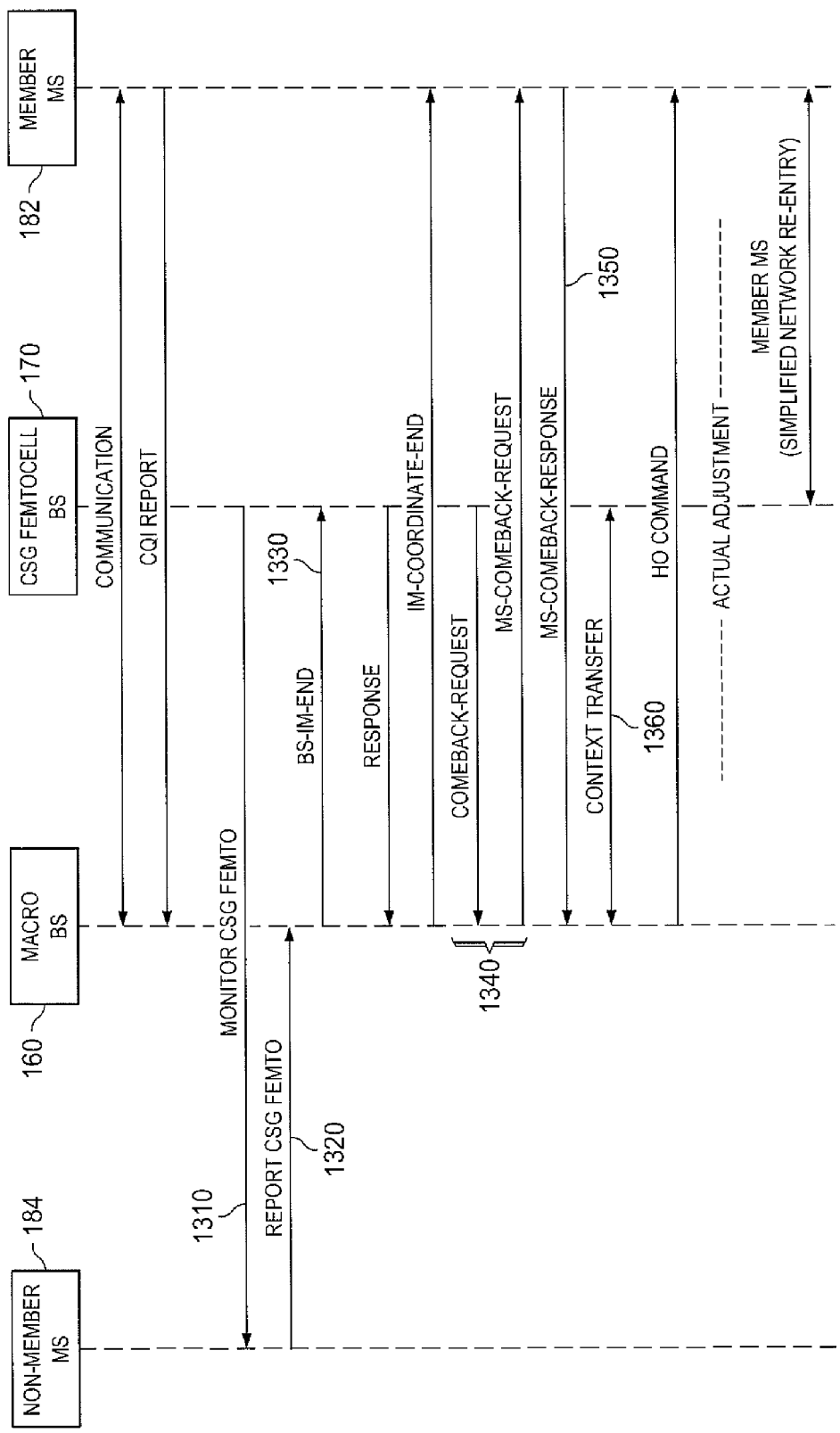
FIG. 13 depicts a timeline that illustrates a process of a CSG femtocell BS resuming its coverage when interference mitigation for a non-member MS is complete, according to one embodiment of the present disclosure.

FIG. 13 depicts a timeline that illustrates a process of a CSG femtocell BS resuming its coverage when interference mitigation for a non-member MS is complete, according to one embodiment of the present disclosure. The timeline also illustrates the corresponding femto-assisted adjustment of a member MS (e.g., a handover back to the CSG femtocell BS 170). The following embodiments are based on the process of coordination.

In one embodiment, non-member MS 184 may monitor femtocell BS 170, and judge whether it is becoming far away from femtocell BS 170 (indicated at 1310). Non-member MS 184 may report its measurement of femtocell BS 170 and/or the estimation of whether it is far away from femtocell BS 170 to macro BS 160 (indicated at 1320). Macro BS 160 may also estimate whether non-member MS 184 is far away.

In one embodiment, when non-member MS 184 becomes far away from femtocell BS 170, macro BS 160 may send a signal (e.g., BS-IM-END) to femtocell BS 170 (indicated at 1330). The BS-IM-END signal indicates that the interference mitigation of non-member MS 184 is over. BS-IM-END may contain non-member MS 184's MS ID, station ID, etc.

In one embodiment, member MS 182 may know the reason that it was asked to handover to another cell, and it may also know its own moving speed. Based on this information, member MS 182 may continue to report information about itself to femtocell BS 170 via macro BS 160 and the backhaul. The reporting may continue even after it hands over to macro BS 160 if member MS 182 has not moved too far away from femtocell BS 170. Upon receiving this information, femtocell BS 170 can know that member MS 182 is still nearby and it can send a "come back" signal (e.g., MS-Comeback-Request) to member MS 182 via macro BS 160 and the backhaul when needed (indicated at 1340). Or, femtocell BS 170 may continue to monitor member MS 182 via the communication between member MS 182 and macro BS 160.

In one embodiment, the comeback signal may contain a reason code indicating why member MS 182 was asked to handover to another cell. The comeback signal can be unicast/multicast/broadcast to member MS 182. In one embodiment, a comeback signal response (e.g., MS-Comeback-Response) may contain a reason code indicating why member MS 182 was asked to handover to another cell (indicated at 1350).

In one embodiment, femtocell BS 170 sends a context request to macro BS 160, and macro BS 160 transfers the context to femtocell BS 170. Alternatively, the BS-IM-END signal can serve as the handover request from the macro BS 160 to femtocell BS 170, and femtocell BS 170 can send a response. The BSs 160, 170 can start context transfer (indicated at 1360).

In one embodiment, both femtocell BS 170 and member MS 182 may cache the information about the connection before the resource adjustment due to interference mitigation. Using the cached information, member MS 182 can perform a simplified network re-entry. Member MS 182 uses the same station ID to perform the ranging and bandwidth request.

In one embodiment, if the BS-IM-END signal is received before the timer T expires, the preparation of the adjustment and the adjustment are terminated.

In one embodiment, the DL power control is done step by step, and measurement is repeatedly sent.

In one embodiment, the network entity such as self-organizing networks (SON) server, or gateway, etc., can be the coordinator of the interference management. The MS can report to the network entity or report to the base stations, and the network entity can communicate with the base stations such as macro, femto, etc., to coordinate the interference management. The network entity may also send messages to the MS, base stations, etc., about the decisions, or information related to the interference management.

Various changes may be made to the components and timelines depicted in FIGS. 9-13. For example, member MS 182 could actually represent more than one member MS. Similarly, non-member MS 184 could actually represent more than one non-member MS. Also, the makeup and arrangement of the steps in FIGS. 9-13 is for illustration only. Steps could be added, omitted, combined, or placed in any other suitable configuration according to particular needs.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. For use in a wireless network, a small base station configured to communicate with a plurality of mobile stations, the small base station comprising:
a memory; and
a processor coupled to the memory, the processor configured to:
in response to a determination of interference at a second mobile station caused by the small base station, coordinate a handover of a first mobile station from the small base station to a neighboring base station; and
adjust a resource of the small base station to mitigate the interference at the second mobile station after the coordination of the handover of the first mobile station,
wherein the processor is configured to coordinate the handover by:

determining that the first mobile station will be affected by the resource adjustment;
determining a resource adjustment timing; and
informing the first mobile station of the resource adjustment and the resource adjustment timing.

2. The small base station of claim 1, the processor further configured to:
cache a communication context of the first mobile station, the communication context comprising at least one of: an identifier of the first mobile station, a basic capability of the first mobile station, a security context, and a security capability.

3. The small base station of claim 2, the processor further configured to:
call back the first mobile station by sending a message via a backhaul communication, the message comprising the cached identifier of the first mobile station.

4. The small base station of claim 1, the processor further configured to:
receive a request to mitigate the interference at the second mobile station; and
adjust the resource of the small base station in response to the request.

5. The small base station of claim 1, the processor further configured to:
perform a handover initiation and preparation phase before the resource adjustment.

6. The small base station of claim 1, wherein the small base station is a closed subscriber group (CSG) femtocell base station, the first mobile station is a member of the CSG, and the second mobile station is not a member of the CSG.

7. The small base station of claim 1, wherein the processor is configured to adjust the resource of the small base station by one of: (i) reducing a transmission power to decrease a coverage area of the small base station, and (ii) not transmitting in one or more predetermined time or frequency slots.

8. The small base station of claim 1, wherein the processor is configured to inform the first mobile station of the resource adjustment and the timer by sending a coordination message to the first mobile station, the coordination message comprising at least one of: a first field indicating a power reduction in dB, and a second field indicating a value of the timer in frame units.

9. The small base station of claim 1, the processor further configured to, upon a determination that the interference mitigation is no longer needed:
adjust the resource of the small base station back to an original value; and
coordinate a handover of the first mobile station from the neighboring base station back to the small base station.

10. The small base station of claim 1, wherein the small base station is one of: a low-power base station, a femtocell base station, a picocell base station, a hot zone base station, and a small relay cell base station.

11. The small base station of claim 1, the processor further configured to transmit a message associated with the resource adjustment to the first mobile station, the message comprising at least one of:
a reason of the resource adjustment;
a manner of the resource adjustment;
a configuration of the resource adjustment;
an effective time of the resource adjustment;
an effective time of the new configuration; and
an expiration time of the current configuration;
an indication that the small base station reduces its transmitting power;
a dB value by which the small base station reduces its transmitting power;
a timing of when the small base station reduces its transmitting power;
an indication that the small base station reserves a resource not to use;
an indication of which resource is reserved not to use by the small base station;
an indication of which subframe is reserved not to use by the small base station;
an indication that the small base station reserves a resource to use;
an indication of which resource is reserved to use by the small base station;
an indication of which subframe is reserved to use by the small base station;
a timing of when the resource will be reserved; and
a timing of when the resource will be released.

12. For use in a small base station in a wireless network, the small base station configured to communicate with a plurality of mobile stations, a method comprising:
in response to a determination of interference at a second mobile station caused by the small base station, coordinating a handover of a first mobile station from the small base station to a neighboring base station;
adjusting a resource of the small base station to mitigate the interference at the second mobile station after the coordination of the handover of the first mobile station
determining that the first mobile station will be affected by the resource adjustment;
determine a resource adjustment timing; and
informing the first mobile station of the resource adjustment and the resource adjustment timing.

13. The method of claim 12, further comprising:
caching a communication context of the first mobile station, the communication context comprising at least one of: an identifier of the first mobile station, a basic capability of the first mobile station, a security context, and a security capability.

14. The method of claim 13, further comprising:
calling back the first mobile station by sending a message via a backhaul communication, the message comprising the cached identifier of the first mobile station.

15. The method of claim 12, further comprising:
receiving a request to mitigate the interference at the second mobile station; and
adjusting the resource of the small base station in response to the request.

16. The method of claim 12, further comprising:
performing a handover initiation and preparation phase before the resource adjustment.

17. The method of claim 12, wherein the small base station is a closed subscriber group (CSG) femtocell base station, the first mobile station is a member of the CSG, and the second mobile station is not a member of the CSG.

18. The method of claim 12, wherein adjusting the resource of the small base station comprises one of: (i) reducing a transmission power to decrease a coverage area of the small base station, and (ii) not transmitting in one or more predetermined time or frequency slots.

19. The method of claim 12, wherein coordinating the handover comprises:
setting a timer to expire concurrently with the resource adjustment; and
arranging for the handover to complete concurrently with the expiration of the timer.

20. The method of claim 19, wherein informing the first mobile station of the resource adjustment and the timer comprises sending a coordination message to the first mobile station, the coordination message comprising at least one of: a first field indicating a power reduction in dB, and a second field indicating a value of the timer in frame units.

21. The method of claim 12, further comprising, upon a determination that the interference mitigation is no longer needed:
adjusting the resource of the small base station back to an original value; and
coordinating a handover of the first mobile station from the neighboring base station back to the small base station.

22. The method of claim 12, wherein the small base station is one of: a low-power base station, a femtocell base station, a picocell base station, a hot zone base station, and a small relay cell base station.

23. The method of claim 12, further comprising:
transmitting a message associated with the resource adjustment to the first mobile station, the message comprising at least one of:
a reason of the resource adjustment;
a manner of the resource adjustment;
a configuration of the resource adjustment;
an effective time of the resource adjustment;
an effective time of the new configuration; and
an expiration time of the current configuration;
an indication that the small base station reduces its transmitting power;
a dB value by which the small base station reduces its transmitting power;
a timing of when the small base station reduces its transmitting power;
an indication that the small base station reserves a resource not to use;
an indication of which resource is reserved not to use by the small base station;
an indication of which subframe is reserved not to use by the small base station;
an indication that the small base station reserves a resource to use;
an indication of which resource is reserved to use by the small base station;
an indication of which subframe is reserved to use by the small base station;
a timing of when the resource will be reserved; and
a timing of when the resource will be released.

24. For use in a wireless network, a mobile station configured to communicate with a small base station, the mobile station comprising:
a memory; and
a processor coupled to the memory, the processor configured to:
receive a message from the small base station, the message in response to a determination of interference at a second mobile station caused by the small base station, the message associated with at least one of: a resource adjustment of the small base station, a resource adjustment reason, and a resource adjustment timing;
in response to the message, coordinate a handover of the mobile station from the small base station to a neighboring base station, wherein the coordination of the handover precedes the resource adjustment of the small base station to mitigate the interference; and
receive a coordination message from the small base station, the coordination message comprising information regarding the resource adjustment and a timer configured to expire concurrently with the resource adjustment.

25. The mobile station of claim 24, the processor further configured to:
cache a communication context of the small base station, the communication context comprising at least one of: an identifier of the mobile station, a basic capability of the mobile station, a security context, and a security capability.

26. The mobile station of claim 24, the processor further configured to:
perform a handover initiation and preparation phase before the resource adjustment.

27. The mobile station of claim 24, wherein the small base station is a closed subscriber group (CSG) femtocell base station, and the mobile station is a member of the CSG.

28. The mobile station of claim 24, wherein the resource adjustment comprises one of: (i) a reduction of a transmission power to decrease a coverage area of the small base station, and (ii) no transmission in one or more predetermined time or frequency slots.

29. The mobile station of claim 24,
wherein the coordination message comprises at least one of: a first field indicating a power reduction in dB, and a second field indicating a value of the timer in frame units.

30. The mobile station of claim 24, the processor further configured to:
upon a determination that the interference mitigation is no longer needed, coordinate a handover of the mobile station from the neighboring base station back to the small base station.

31. The mobile station of claim 24, wherein the small base station is one of: a low-power base station, a femtocell base station, a picocell base station, a hot zone base station, and a small relay cell base station.

32. The mobile station of claim 24, the processor further configured to:
receive a message associated with the resource adjustment from the small base station, the message comprising at least one of:
a reason of the resource adjustment;
a manner of the resource adjustment;
a configuration of the resource adjustment;
an effective time of the resource adjustment;
an effective time of the new configuration; and
an expiration time of the current configuration;
an indication that the small base station reduces its transmitting power;
a dB value by which the small base station reduces its transmitting power;
a timing of when the small base station reduces its transmitting power;
an indication that the small base station reserves a resource not to use;
an indication of which resource is reserved not to use by the small base station;
an indication of which subframe is reserved not to use by the small base station;
an indication that the small base station reserves a resource to use;
an indication of which resource is reserved to use by the small base station;
an indication of which subframe is reserved to use by the small base station;
a timing of when the resource will be reserved; and
a timing of when the resource will be released.

33. For use in a mobile station wireless network, the mobile station configured to communicate with a small base station, a method comprising:
receiving a coordinating message from the small base station, the coordinating message comprising information regarding a resource adjustment timing, the coordinating message comprising at least one of: a first field indicating a power reduction in decibels (dB), and a second field indicating the resource adjustment timing; and in response to the message, coordinating a handover of the mobile station from the small base station to a neighboring base station, wherein the coordinating of the handover precedes the resource adjustment of the small base station to mitigate the interference at the second mobile station.

34. The method of claim 33, further comprising:
caching a communication context of the small base station, the communication context comprising at least one of: an identifier of the mobile station, a basic capability of the mobile station, a security context, and a security capability.

35. The method of claim 33, further comprising:
performing a handover initiation and preparation phase before the resource adjustment.

36. The method of claim 33, wherein the small base station is a closed subscriber group (CSG) femtocell base station, and the mobile station is a member of the CSG.

37. The method of claim 33, wherein the resource adjustment comprises one of: (i) a reduction of a transmission power to decrease a coverage area of the small base station, and (ii) no transmission in one or more predetermined time or frequency slots.

38. The method of claim 33, further comprising:
upon a determination that the interference mitigation is no longer needed, coordinating a handover of the mobile station from the neighboring base station back to the small base station.

39. The method of claim 33, wherein the small base station is one of: a low-power base station, a femtocell base station, a picocell base station, a hot zone base station, and a small relay cell base station.

40. The method of claim 33, further comprising:
receiving a message associated with the resource adjustment from the small base station, the message comprising at least one of:
a reason of the resource adjustment;
a manner of the resource adjustment;
a configuration of the resource adjustment;
an effective time of the resource adjustment;
an effective time of the new configuration; and
an expiration time of the current configuration;
an indication that the small base station reduces its transmitting power;
a dB value by which the small base station reduces its transmitting power;
a timing of when the small base station reduces its transmitting power;
an indication that the small base station reserves a resource not to use;
an indication of which resource is reserved not to use by the small base station;
an indication of which subframe is reserved not to use by the small base station;
an indication that the small base station reserves a resource to use;
an indication of which resource is reserved to use by the small base station;
an indication of which subframe is reserved to use by the small base station;
a timing of when the resource will be reserved; and
a timing of when the resource will be released.

* * * * *